US011601626B2

United States Patent
Takahashi et al.

(10) Patent No.: US 11,601,626 B2
(45) Date of Patent: Mar. 7, 2023

(54) IMAGE PROCESSING APPARATUS AND METHOD

(71) Applicant: SONY CORPORATION, Tokyo (JP)

(72) Inventors: Noriaki Takahashi, Tokyo (JP); Takahiro Nagano, Kanagawa (JP); Hiromasa Naganuma, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/486,282

(22) PCT Filed: Feb. 26, 2018

(86) PCT No.: PCT/JP2018/006880
§ 371 (c)(1),
(2) Date: Aug. 15, 2019

(87) PCT Pub. No.: WO2018/163875
PCT Pub. Date: Sep. 13, 2018

(65) Prior Publication Data
US 2020/0053330 A1 Feb. 13, 2020

(30) Foreign Application Priority Data
Mar. 9, 2017 (JP) ............................. JP2017-044468

(51) Int. Cl.
*H04N 9/31* (2006.01)
*G06T 5/00* (2006.01)
(Continued)

(52) U.S. Cl.
CPC ........... *H04N 9/3179* (2013.01); *G06T 5/003* (2013.01); *H04N 7/0127* (2013.01);
(Continued)

(58) Field of Classification Search
None
See application file for complete search history.

(56) References Cited

U.S. PATENT DOCUMENTS 6,456,339 B1 * 9/2002 Surati .................... G03B 37/04
348/744
6,717,625 B1 * 4/2004 Thielemans ............. H04N 9/31
348/745
(Continued)

FOREIGN PATENT DOCUMENTS

| CN | 1953508 A | 4/2007 |
| CN | 101180873 A | 5/2008 |

(Continued)

OTHER PUBLICATIONS

International Search Report and Written Opinion of PCT Application No. PCT/JP2018/006880, dated May 22, 2018, 11 pages of ISRWO.

(Continued)

*Primary Examiner* — Brian P Yenke
(74) *Attorney, Agent, or Firm* — Chip Law Group

(57) ABSTRACT

The present disclosure relates to an image processing apparatus and method that enable suppression of a reduction in subjective image quality. Image processing is performed on each of a plurality of frame images before projection. The image processing suppresses an influence of superimposition of the plurality of frame images in a projection image in projecting each of the plurality of frame images cyclically using a corresponding one of a plurality of projection sections. The plurality of frame images is included in a moving image. The present disclosure can be applied to, for example, an image processing apparatus, an image projection apparatus, a control apparatus, an information processing apparatus, an image projection system, an image processing method, a program, or the like.

14 Claims, 21 Drawing Sheets

(51) Int. Cl.
  *H04N 7/01* (2006.01)
  *G06T 5/50* (2006.01)
(52) U.S. Cl.
  CPC ............ *H04N 9/3147* (2013.01); *G06T 5/50* (2013.01); *G06T 2207/10016* (2013.01); *G06T 2207/20201* (2013.01)

(56) References Cited

U.S. PATENT DOCUMENTS

| | | | |
|---|---|---|---|
| 6,760,075 B2* | 7/2004 | Mayer, III | H04N 9/12 |
| | | | 345/1.3 |
| 8,477,241 B2* | 7/2013 | Chang | H04N 9/3147 |
| | | | 348/383 |
| 9,918,058 B2* | 3/2018 | Takahashi | H04N 5/225 |
| 10,602,102 B2* | 3/2020 | Ishikawa | G03B 21/60 |
| 11,394,941 B2* | 7/2022 | Suzuki | G06T 5/20 |
| 2002/0024481 A1 | 2/2002 | Kawabe et al. | |
| 2002/0024640 A1 | 2/2002 | Ioka | |
| 2003/0090597 A1* | 5/2003 | Katoh | H04N 9/3111 |
| | | | 348/744 |
| 2004/0246242 A1* | 12/2004 | Sasaki | G09G 3/342 |
| | | | 345/204 |
| 2005/0281536 A1* | 12/2005 | Aiso | H04N 1/32101 |
| | | | 386/248 |
| 2007/0085930 A1 | 4/2007 | Kobayashi et al. | |
| 2007/0097334 A1* | 5/2007 | Damera-Venkata | |
| | | | H04N 9/3147 |
| | | | 353/94 |
| 2008/0309823 A1* | 12/2008 | Hahn | H04N 7/012 |
| | | | 348/606 |
| 2008/0309884 A1 | 12/2008 | O'Dor et al. | |
| 2011/0234921 A1* | 9/2011 | Ivashin | H04N 9/3147 |
| | | | 348/745 |
| 2011/0310354 A1* | 12/2011 | Fujimori | G03B 21/13 |
| | | | 353/31 |
| 2014/0340529 A1* | 11/2014 | Shibata | H04N 9/3194 |
| | | | 348/189 |
| 2014/0354674 A1* | 12/2014 | Okamoto | H04N 9/3182 |
| | | | 345/590 |
| 2015/0172646 A1* | 6/2015 | Smithwick | H04N 13/349 |
| | | | 348/51 |
| 2015/0320301 A1* | 11/2015 | Kaneko | A61B 1/00009 |
| | | | 600/109 |
| 2016/0088276 A1* | 3/2016 | Lin | H04N 9/3185 |
| | | | 348/207.1 |
| 2016/0267878 A1* | 9/2016 | Maeda | H04W 4/80 |
| 2018/0213192 A1* | 7/2018 | Jang | G09G 5/397 |
| 2021/0074243 A1* | 3/2021 | Takahashi | H04N 13/125 |
| 2021/0195153 A1* | 6/2021 | Suzuki | H04N 9/3194 |

FOREIGN PATENT DOCUMENTS

| | | |
|---|---|---|
| CN | 104836964 A | 8/2015 |
| CN | 105338220 A | 2/2016 |
| EP | 1777656 A1 | 4/2007 |
| JP | 06-276465 A | 9/1994 |
| JP | 2002-082657 A | 3/2002 |
| JP | 2004-266808 A | 9/2004 |
| JP | 2005-136868 A | 5/2005 |
| JP | 2006-195206 A | 7/2006 |
| JP | 2006195206 A * | 7/2006 |
| JP | 2007-114269 A | 5/2007 |
| JP | 2008-539675 A | 11/2008 |
| JP | 2009-110028 A | 5/2009 |
| JP | 2010-019922 A | 1/2010 |
| JP | 2011039323 A * | 2/2011 |
| KR | 2002-0005397 A | 1/2002 |
| WO | 2006/116536 A1 | 11/2006 |
| WO | 2011/134834 A2 | 11/2011 |
| WO | 2014/155509 A1 | 10/2014 |
| WO | 2016/098600 A1 | 6/2016 |

OTHER PUBLICATIONS

Jun, et al., "Method of image alignment for calibration of multiprojector displays", Journal of Image and Graphics, vol. 16, No. 2, Feb. 2011, pp. 293-299.

Office Action for CN Patent Application No. 201880015586.5, dated Jun. 30, 2021, 12 pages of English Translation and 05 pages of Office Action.

* cited by examiner

IMAGE PROCESSING APPARATUS AND METHOD

CROSS REFERENCE TO RELATED APPLICATIONS

This application is a U.S. National Phase of International Patent Application No. PCT/JP2018/006880 filed on Feb. 26, 2018, which claims priority benefit of Japanese Patent Application No. JP 2017-044468 filed in the Japan Patent Office on Mar. 9, 2017. Each of the above-referenced applications is hereby incorporated herein by reference in its entirety.

TECHNICAL FIELD

The present disclosure relates to an image processing apparatus and method, and particularly relates to an image processing apparatus and method that enable suppression of a reduction in subjective image quality.

BACKGROUND ART

In the past, there have been methods of distributing a high-frame-rate video to low-frame-rate image projection apparatuses to project the video (see PTLs 1 to 3, for example).

CITATION LIST

Patent Literature

[PTL 1]
Japanese Patent Laid-Open No. 2009-110028
[PTL 2]
Japanese Patent Laid-Open No. 2005-136868
[PTL 3]
Japanese Patent Laid-Open No. 2004-266808

SUMMARY

Technical Problem

In these cases, however, a plurality of frame images is projected at the same time. Therefore, there has been a possibility that a superimposition blur occurs in a portion including motion, resulting in reduced subjective image quality.

The present disclosure has been made in view of such circumstances and enables suppression of a reduction in subjective image quality.

Solution to Problem

An image processing apparatus according to one aspect of the present technology includes an image processing section configured to perform image processing on each of a plurality of frame images before projection, the image processing suppressing an influence of superimposition of the plurality of frame images in a projection image in projecting each of the plurality of frame images cyclically using a corresponding one of a plurality of projection sections, the plurality of frame images being included in a moving image.

The image processing section can perform image processing for correcting a pixel value of each of the frame images.

The image processing section can correct the pixel value such that an error between a corresponding one of the frame images and the projection image is minimized.

The image processing section can set up an objective function and a constraint as a linear programming problem to obtain a corrected pixel value as a solution.

The image processing section can define the objective function such that a total sum of the errors is minimized.

The image processing section can define the constraint such that the corresponding one of the frame images is smaller than a sum of the frame images corrected and the error and is greater than a difference between the frame images corrected and the error, and such that the error is positive.

The image processing section can further define a constraint such that a size of the corrected pixel value is limited according to a bit depth of the pixel value.

The image processing section can obtain the corrected pixel value using an internal point method.

The image processing section can obtain the corrected pixel value using a simplex method.

The image processing section can set up a formula for all pixels of the corresponding one of the frame images to obtain a solution.

The image processing section can set up a formula for all frames of the moving image to obtain a solution.

The image processing section can optimize a filter for correcting the pixel value of the corresponding one of the frame images such that the error is minimized and correct the frame image using the optimized filter.

The image processing section can optimize the filter by a method of least squares using an image prepared in advance as a learning sample, the filter being optimized such that the error is minimized.

The image processing section can optimize the filter using, as the learning sample, all pixels of the image prepared in advance.

A distribution section configured to cyclically distribute, to a plurality of the projection sections, the frame images each including the pixel value corrected by the image processing section can be further included.

A plurality of the projection sections configured to project the frame images distributed by the distribution section to the projection sections themselves can be further included.

A plurality of the projection sections can each project the frame images at a rate lower than a frame rate of the moving image, the frame images being distributed to the projection sections themselves.

An image processing method according to one aspect of the present technology includes performing image processing on each of a plurality of frame images before projection, the image processing suppressing an influence of superimposition of the plurality of frame images in a projection image in projecting each of the plurality of frame images cyclically using a corresponding one of a plurality of projection sections, the plurality of frame images being included in a moving image.

In an image processing apparatus and method according to one aspect of the present technology, image processing is performed on each of a plurality of frame images before projection. The image processing suppresses an influence of superimposition of the plurality of frame images in a projection image in projecting each of the plurality of frame images cyclically using a corresponding one of a plurality of projection sections. The plurality of frame images is included in a moving image.

Advantageous Effects of Invention

According to the present disclosure, an image can be processed. Particularly, a reduction in subjective image quality can be suppressed.

DESCRIPTION OF EMBODIMENTS

Hereinafter, modes for carrying out the present disclosure (hereinafter referred to as embodiments) will be described. It is noted that the description will be given in the following order.
1. High-Frame-Rate Image Projection Using a Plurality of Projection Apparatuses
2. First Embodiment (Image Projection System/Linear Programming)
3. Second Embodiment (Image Projection System/ Method of Least Squares)
4. Third Embodiment (Image Projection System/Other Examples of Configuration)
5. Others 1. High-Frame-Rate Image Projection Using a Plurality of Projection Apparatuses <Image Projection System>

Figure 1:
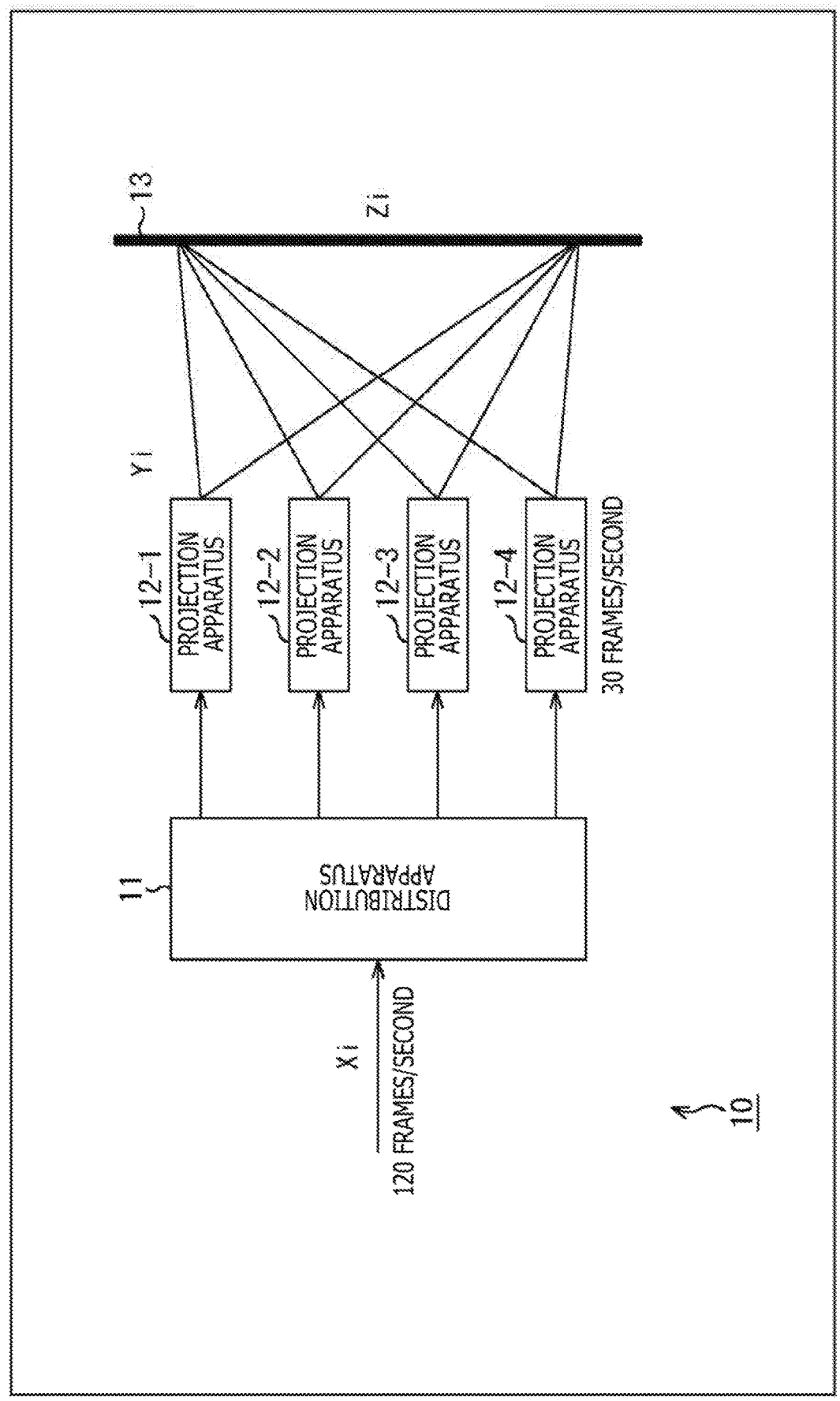
FIG. 1 is a block diagram illustrating an example of a main configuration of an image projection system.

In the past, there have been methods of distributing a high-frame-rate video to low-frame-rate image projection apparatuses to project the video, as described in PTLs 1 to 3, for example. An image projection system 10 illustrated in FIG. 1 is a system that projects a moving image using four projection apparatuses 12 (projection apparatuses 12-1 to 12-4), for example.

Figure 2:
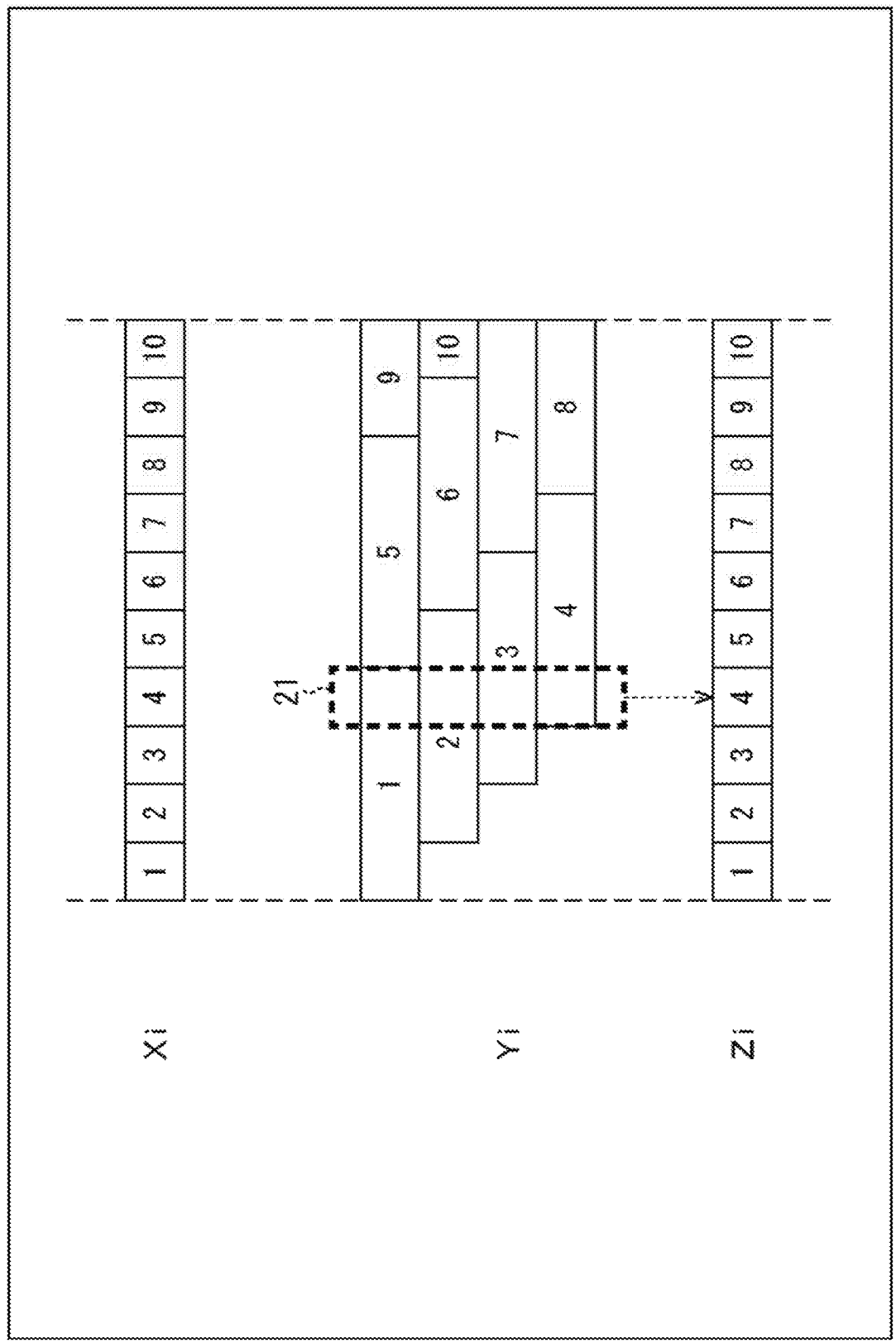
FIG. 2 is a diagram for describing an example of how image projection is performed.

The frame rate of a moving image to be input is 120 frames per second. By contrast, each of the projection apparatuses 12-1 to 12-4 projects images at 30 frames per second. Accordingly, a distribution apparatus 11 sequentially and cyclically distributes each frame image of the input image to the projection apparatuses 12-1 to 12-4 as illustrated in FIG. 2. Each of the projection apparatuses 12-1 to 12-4 sequentially projects the frame images distributed thereto. Since the frame rate of each projection apparatus 12 is 30 frames per second, each projection apparatus 12 is supplied with the next frame image from the distribution apparatus 11 at the timing when the projection of the previous frame image is completed. Therefore, each projection apparatus 12 projects the next frame image. In this manner, the projection apparatuses 12 project the respective frame images at timings shifted by $1/120$ second from each other.

For example, the projection apparatus 12-1 projects frame images of the frame numbers 1, 5, 9, . . . . At a timing delayed by $1/120$ second therefrom, the projection apparatus 12-2 projects frame images of the frame numbers 2, 6, 10, . . . . At a timing delayed by $1/120$ second therefrom, the projection apparatus 12-3 projects frame images of the frame numbers 3, 7, 11, . . . . At a timing delayed by $1/120$ second therefrom, the projection apparatus 12-4 projects frame images of the frame numbers 4, 8, 12, . . . .

Therefore, a projection image projected on a screen 13 is an image in which the images projected from the respective projection apparatuses 12 are superimposed on each other. For example, as indicated by a dotted line frame 21, a projection image of the frame number 4 is an image in which the frame image of the frame number 1 projected by the projection apparatus 12-1, the frame image of the frame number 2 projected by the projection apparatus 12-2, the frame image of the frame number 3 projected by the projection apparatus 12-3, and the frame image of the frame number 4 projected by the projection apparatus 12-4 are superimposed on each other. As illustrated in FIG. 2, the frame images superimposed in this manner change every $1/120$ second. That is, since the projection image changes every $1/120$ second, the frame rate of the projection image is 120 frames per second.

With this method, however, the frame images at mutually different times are superimposed on each other in the projection image, as indicated by the dotted line frame 21 in FIG. 2. Therefore, in the case of an image including motion, there has been a possibility that a superimposition blur occurs in this portion, resulting in reduced subjective image quality.

Figure 3B:
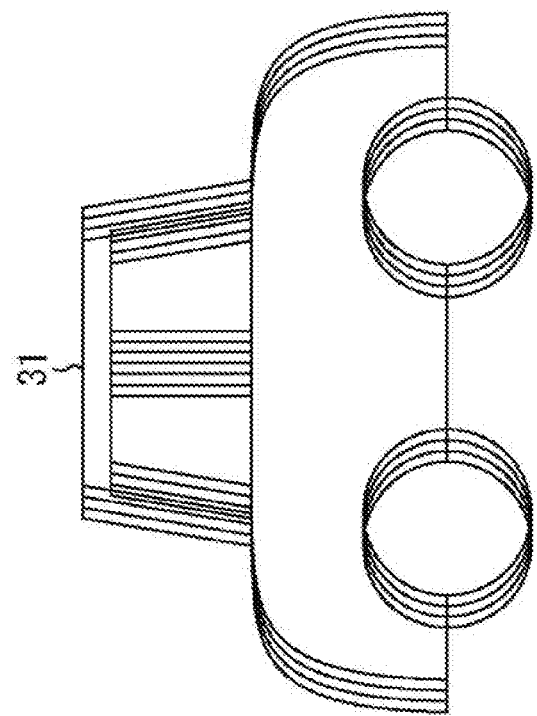
FIGS. 3A and 3B are diagrams illustrating an example of a projection image.
Figure 3A:
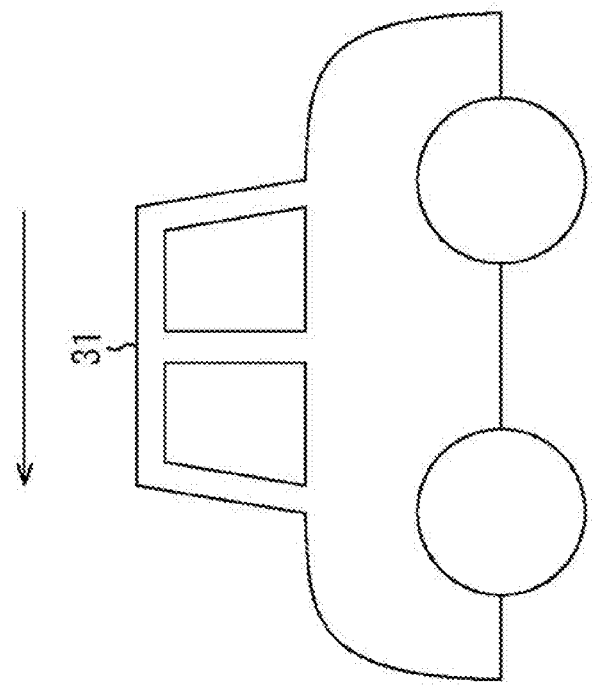

For example, in the case of a moving image in which a vehicle 31 moves from right to left as illustrated in FIG. 3A, the position of the vehicle 31 is different from frame to frame. Therefore, when these frame images are superimposed on each other, the positions of the vehicle 31 superimposed are shifted from each other, as in the example illustrated in FIG. 3B. This results in occurrence of a so-called superimposition blur which appears to be an afterimage. Therefore, there has been a possibility that the subjective image quality is reduced.

Figure 4:
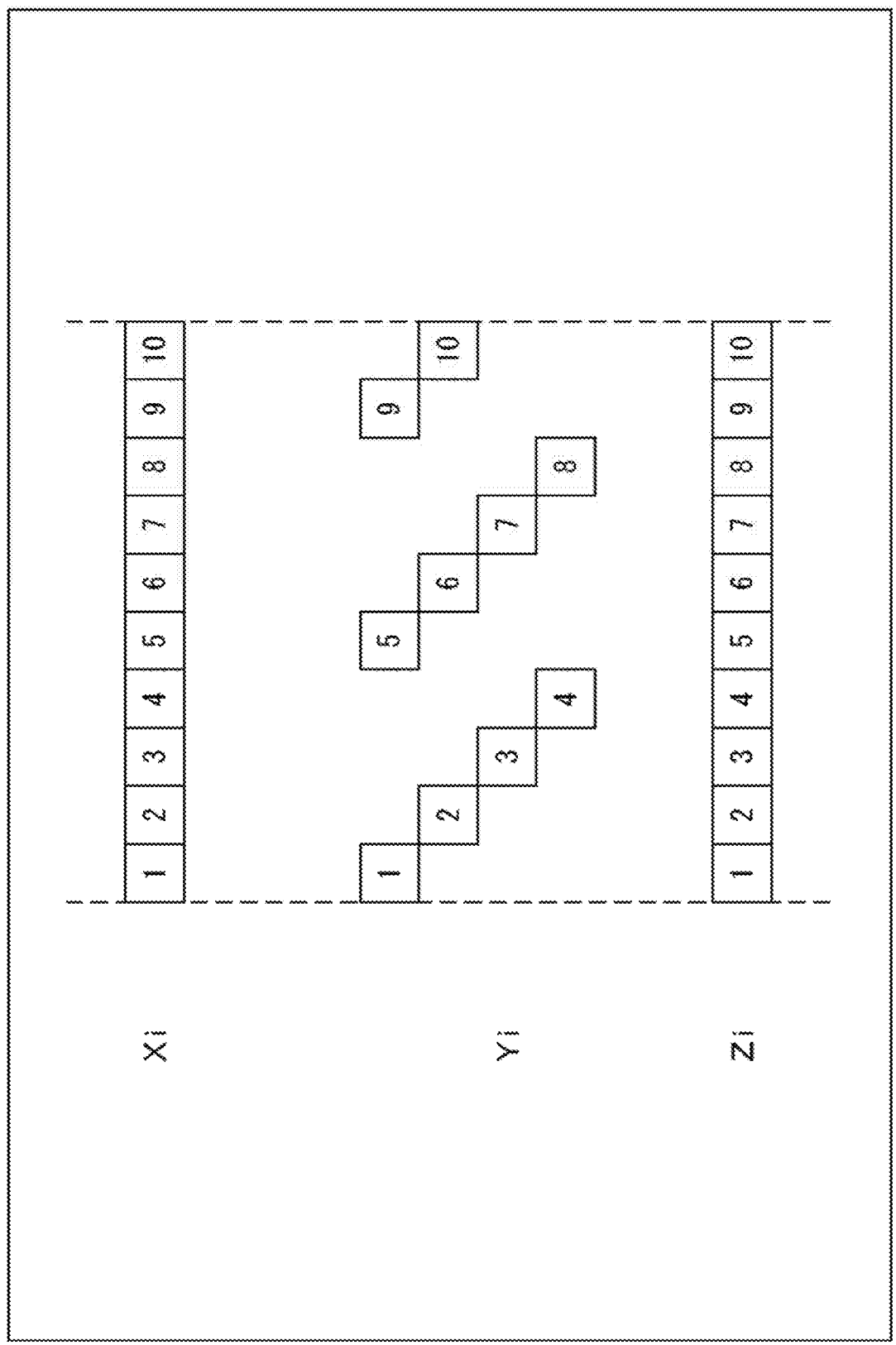
FIG. 4 is a diagram for describing an example of how image projection is performed.

By contrast, another possible method is to cause each projection apparatus 12 to project each frame image for the duration of only 1/120 second as illustrated in FIG. 4, for example. With this method, the images projected by the respective projection apparatuses 12 are not superimposed on each other in the projection image. Therefore, it is possible to suppress the occurrence of the superimposition blur. In this case, however, brightness is reduced to one fourth as compared with the example in FIG. 2. Therefore, there has been a possibility that the subjective image quality is reduced.

<Compensation for Superimposition Blur>

Accordingly, image processing is performed on each of the plurality of frame images before projection. The image processing suppresses an influence of superimposition of the plurality of frame images in the projection image in projecting each of the plurality of frame images cyclically using a corresponding one of the plurality of projection sections. The plurality of frame images is included in the moving image. In this manner, it is possible to suppress the occurrence of the superimposition blur without reducing the brightness. That is, it is possible to suppress a reduction in subjective image quality.

2. First Embodiment

<Image Projection System>

Figure 5:
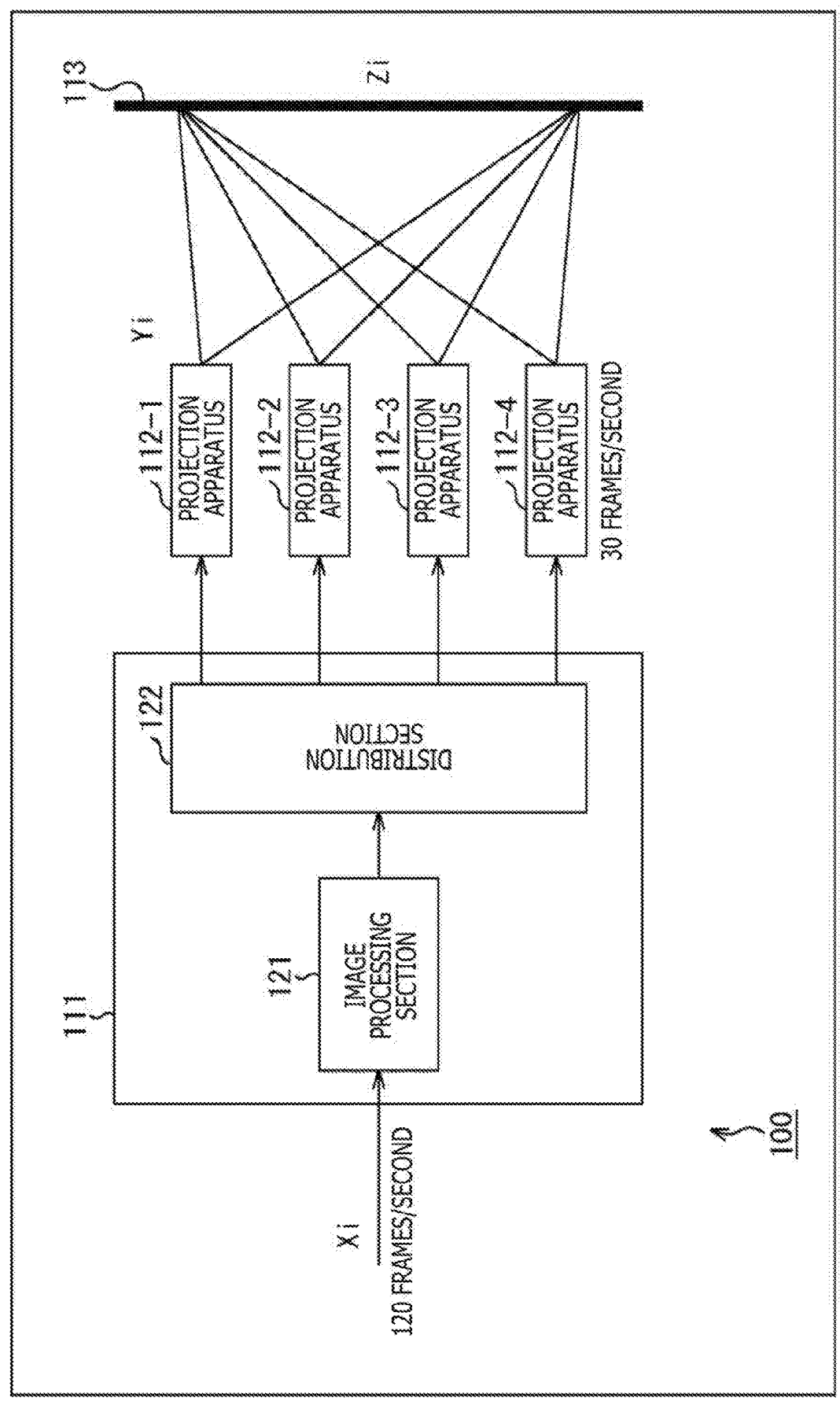
FIG. 5 is a block diagram illustrating an example of a main configuration of an image projection system.

FIG. 5 is a block diagram illustrating an example of a main configuration of one embodiment of an image projection system to which the present technology is applied. In FIG. 5, an image projection system 100 is a system that can project a moving image with a frame rate higher than the frame rate of each of a plurality of projection apparatuses by projecting each of frame images of the moving image cyclically using a corresponding one of the plurality of projection apparatuses.

As illustrated in FIG. 5, the image projection system 100 includes a central processing unit 111 and projection apparatuses 112-1 to 112-4. The central processing unit 111 is one embodiment of an image processing apparatus to which the present technology is applied, and performs processing related to each frame image of a moving image to be projected. The central processing unit 111 includes an image processing section 121 and a distribution section 122, for example. The image processing section 121 is one embodiment of an image processing section to which the present technology is applied, and performs processing related to the image processing on each frame image of the moving image to be projected. The distribution section 122 performs processing related to the distribution of each frame image of the moving image to be projected.

Each of the projection apparatuses 112-1 to 112-4 is an apparatus that has a function of projecting an image and performs processing related to the projection of the image. It is noted that in a case where the projection apparatuses 112-1 to 112-4 do not need to be distinguished from each other in the description, the projection apparatuses 112-1 to 112-4 will be referred to as projection apparatuses 112. Each projection apparatus 112 projects images at a frame rate of 30 frames per second, for example.

The central processing unit 111 receives an input image (moving image) with a frame rate of 120 frames per second. The image processing section 121 performs image processing on each frame image of the input image. The image processing suppresses an influence of superimposition of the plurality of frame images in a projection image projected on a screen 113. This image processing will be described in detail later. The image processing section 121 supplies each frame image on which the image processing has been performed to the distribution section 122 at a frame rate of 120 frames per second.

The distribution section 122 sequentially and cyclically distributes each of the supplied frame images to a corresponding one of the projection apparatuses 112-1 to 112-4. For example, the distribution section 122 distributes frame images of the frame numbers 1, 5, 9, ... to the projection apparatus 112-1, frame images of the frame numbers 2, 6, 10, ... to the projection apparatus 112-2, frame images of the frame numbers 3, 7, 11, ... to the projection apparatus 112-3, and frame images of the frame numbers 4, 8, 12, ... to the projection apparatus 112-4.

Each projection apparatus 112 sequentially outputs the frame images distributed thereto as output images, and projects the images at the same position of the screen 113. As described above, one frame is distributed to a corresponding one of the projection apparatuses 112 every four frames of the moving image with a frame rate of 120 frames per second. That is, each projection apparatus 112 is supplied with frame images at a frame rate of 30 frames per second. Therefore, each projection apparatus 112 that can project images at a frame rate of 30 frames per second can sequentially project the supplied frame images. That is, the image projection system 100 can project the input image at the frame rate of the input image using the projection apparatuses 112 that each projects images at a rate lower than the frame rate of the input image. In other words, the image projection system 100 can project, at the frame rate of the input image, the input image whose rate is higher than the frame rate of the image projection of each of the projection apparatuses 112.

Further, since the distribution section 122 sequentially distributes each frame image of the moving image with 120 frames per second, the timing at which each frame image is distributed to a corresponding one of the projection apparatuses 112 is shifted by 1/120 second each. Accordingly, the timing at which each projection apparatus 112 projects the corresponding output image is also shifted by 1/120 second each. Therefore, the image projection system 100 can project the image at a frame rate of 120 frames per second, as in the case of the image projection system 10 in FIG. 1.

For example, the frame number of the input image of the central processing unit 111 is assumed to be i. Further, for an arbitrary pixel of a frame image whose frame number is i, the pixel value of the input image is assumed to be $X_i$ while the pixel value of the output image projected by the corresponding projection apparatus 112 is assumed to be $Y_i$. For example, in a case where the frame number of the output image of the corresponding projection apparatus 112 is assumed to be j, a relationship between i and j is as follows.

Projection apparatus 112-1: $i=4j+1$
Projection apparatus 112-2: $i=4j+2$
Projection apparatus 112-3: $i=4j+3$
Projection apparatus 112-4: $i=4j+4$ Further, the pixel value of the projection image projected on the screen 113 is assumed to be $Z_i$ for the same pixel. If the distribution section 122 distributes each frame image of the input image to a corresponding one of the projection apparatuses 112 without the image processing section 121 performing the image processing, the relationship between the pixel value Yi of the output image and the pixel value Zi of the projection image is as expressed by the following formula (1).

$$Y_i = X_i \quad (1)$$

Since the projection apparatuses 112-1 to 112-4 project the images each shifted by 1/120 seconds, the relationship between the pixel value Yi and the pixel value Zi in the projection image projected on the screen 113 is as expressed by the following formula (2) or (3). That is, the pixel values of four consecutive frames are added and output. Therefore, the brightness is four times the brightness of one image.

$$Z_i = Y_i + Y_{i+1} + Y_{i+2} + Y_{i+3} \quad (2)$$

$$Z_i = X_i + X_{i+1} + X_{i+2} + X_{i+3} \quad (3)$$

Then, the image processing section 121 performs the image processing on the images to be projected, as described above. For example, the image processing section 121 performs image processing for correcting the pixel values of each frame image. For example, the image processing section 121 corrects each pixel value such that an error between a corresponding one of the frame images and the projection image is minimized. In this manner, it is possible to suppress the occurrence of the superimposition blur in the projection image. Further, since the duration of projection of each frame image by each projection apparatus 112 is not shortened, it is also possible to suppress a reduction in brightness of the projection image. That is, it is possible to suppress a reduction in subjective image quality.

<Linear Programming>

Figure 6:
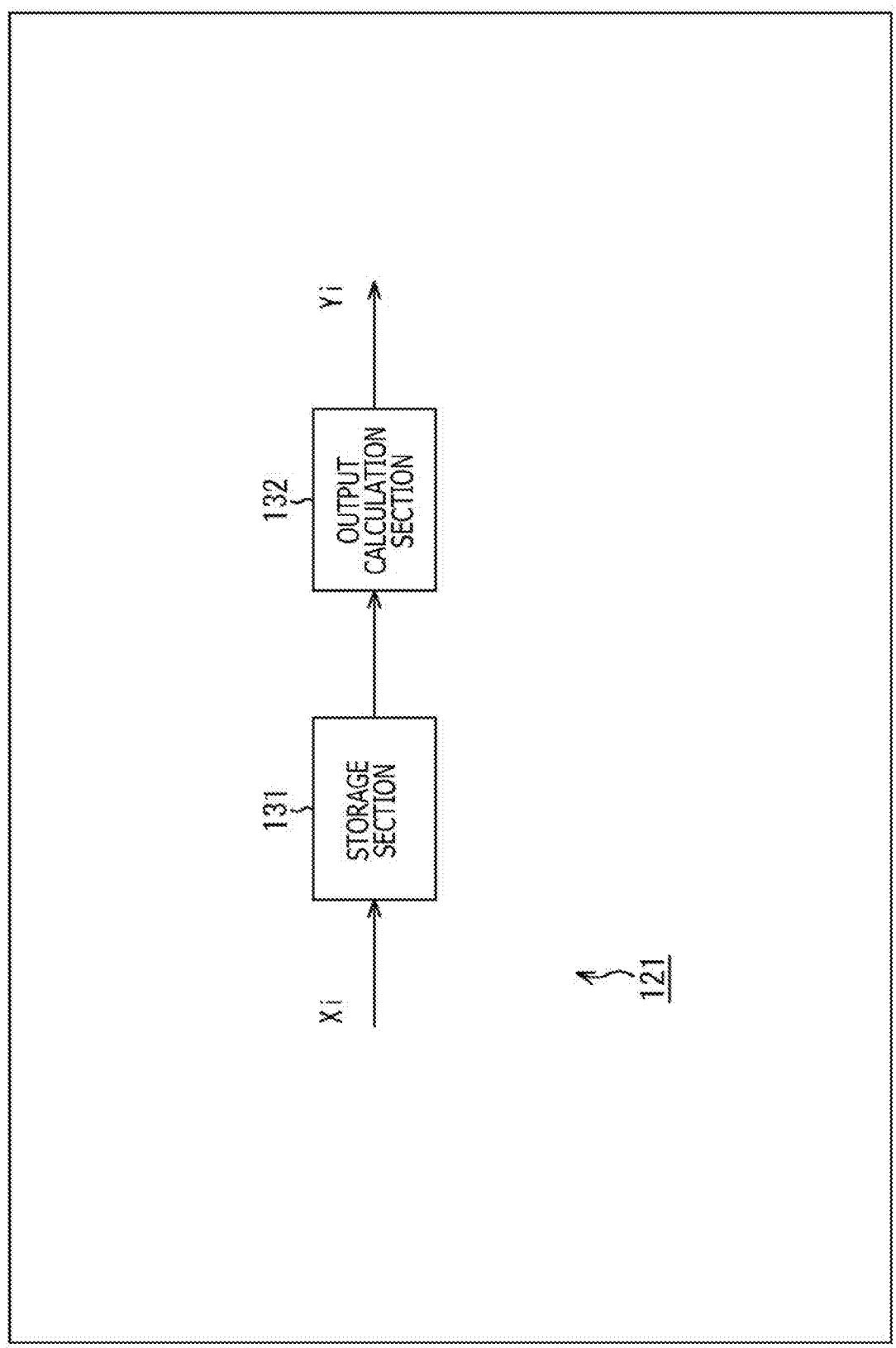
FIG. 6 is a block diagram illustrating an example of an image processing section.

At this time, the image processing section 121 may set up an objective function and constraints as a linear programming problem to obtain a corrected pixel value as a solution. FIG. 6 is a block diagram illustrating an example of a main configuration of the image processing section 121. As illustrated in FIG. 6, the image processing section 121 includes a storage section 131 and an output calculation section 132. The storage section 131 stores all frame images of the input moving image. The storage section 131 supplies the stored pixel value Xi to the output calculation section 132 at a predetermined timing or on the basis of a request from the outside such as the output calculation section 132.

The output calculation section 132 obtains the pixel value Xi stored in the storage section 131. On the basis of the pixel value Xi, the output calculation section 132 sets up the objective function and the constraints as the linear programming problem to obtain the corrected pixel value as the solution. That is, the output calculation section 132 calculates the pixel value Yi of the output image as the solution such that the error (difference value) between the input image and the projection image is minimized.

Figure 7:
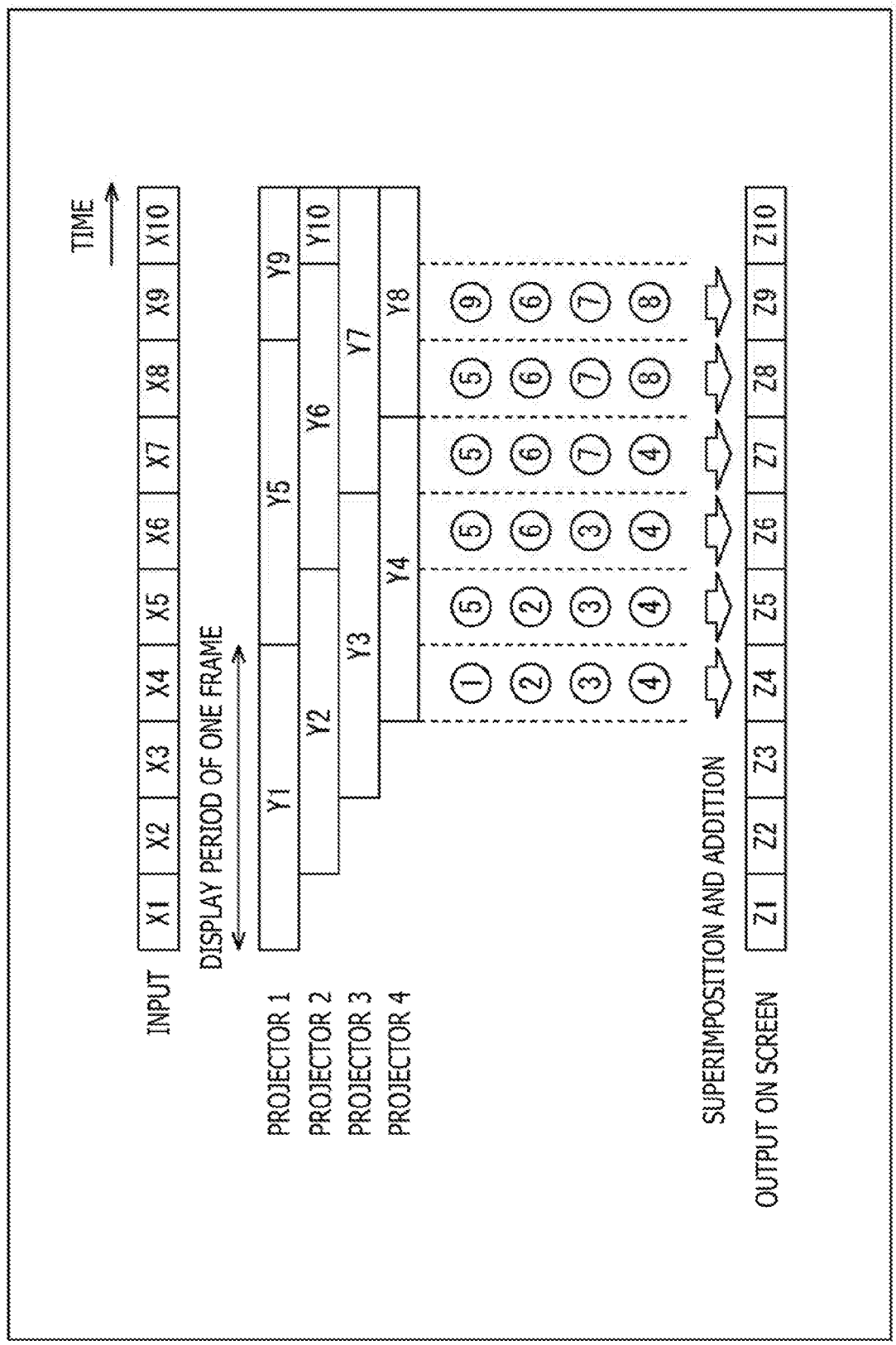
FIG. 7 is a diagram for describing an example of how image projection is performed.

In this case, the projection image projected on the screen 113 is an image in which four output images projected by the respective projection apparatuses 112 are superimposed on each other, as illustrated in FIG. 7. In a case where an error (difference value) of the projection image relative to the corresponding input image is assumed to be ei, a relationship between the pixel value Zi and the pixel value Xi can be expressed as the following formula (4) using this error ei on the basis of the formula (3).

$$Z_i = 4X_i + e_i \quad (4)$$

The output calculation section 132 sets up a constraint such as the following formula (5) on the basis of the formulas (2) and (4) described above. It is noted that a range of the frames for obtaining optimization is i=1 to n.

$$4X_i + e_i = Y_i + Y_{i+1} + Y_{i+2} + Y_{i+3}|_{i=4-n} \quad (5)$$

In addition, the output calculation section 132 uses the formula (5) to set up two constraints such as the following formulas (6) and (7).

$$4X_i \leq Y_i + Y_{i+1} + Y_{i+2} + Y_{i+3} + e_i|_{i=4-n} \quad (7)$$

$$4X_i \geq Y_i + Y_{i+1} + Y_{i+2} + Y_{i+3} + e_i|_{i=4-n} \quad (7)$$

In addition, a constraint is set up such that the error ei is a positive value as in the following formula (8).

$$0 \leq e_i|_{i=4-n} \quad (8)$$

That is, the output computation section 132 defines the constraints such that the pixel value of the corresponding frame image (input image) before correction is smaller than the sum of the pixel values of a plurality of frame images (output images) corrected and superimposed on each other in the projection image and the error (difference value) between the corresponding frame image before correction and the projection image and is greater than the difference between the sum of the pixel values of the plurality of frame images corrected and the error, and such that the error is positive.

Then, the output computation section 132 defines an objective function such that the total sum of errors is minimized as in the following formula (9).

$$\min: \sum_{i=4}^{n} e_i \quad (9)$$

The output computation section 132 performs similar formulation for each of coordinates of interest. Using each formula set up as described above, the output computation section 132 obtains the pixel value Yi of the image to be projected by the corresponding projection apparatus 112 (that is, the pixel value corrected by the image processing of the image processing section 121) such that the error ei is minimized. This solution is arbitrary; for example, an internal point method, a simplex method, or the like may be used.

When the optimal pixel value Yi has been calculated for each pixel of the frame image, the output calculation section 132 supplies each frame image of the moving image corrected to the calculated optimal pixel values Yi to the distribution section 122 at a frame rate of 120 frames per second.

The distribution section 122 sequentially distributes the frame images (including the pixel values corrected) on which the image processing has been performed by the image processing section 121 in this manner to the respective projection apparatuses 112. Each of the projection apparatuses 112 sequentially projects the frame images distributed thereto to the screen 113 at a frame rate of 30 frames per second. In this manner, the projection image projected on the screen 113 has a minimum error relative to the corresponding input image without reducing the brightness. Therefore, it is possible to suppress a reduction in subjective image quality.

It is noted that since the dynamic range (bit depth of a pixel value) of an image is predetermined, the pixel value Yi is subject to this constraint. Therefore, a limitation according to the bit depth may be added as a constraint. For example, in a case where the bit depth of the pixel value is 8 bits, the output computation section 132 can add a constraint as expressed in the following formula (10).

$$0 \leq Y_i \leq 255|_{i=1-n} \tag{10}$$

Further, the section of the frame numbers i=1, 2, and 3 is where the four frame images have not been superimposed in the projection image, and therefore is not included in the constraints above. Another constraint may be set up to perform calculation for this section. In this manner, a reduction in subjective image quality can be suppressed from the first frame. Alternatively, the image processing for this section may be omitted. In this manner, it is possible to suppress an increase in load that would otherwise be caused by performing the image processing.

<Flow of Image Display Processing>

Next, a flow of processing executed in such an image projection system 100 will be described. In a case where the image projection system 100 projects a high-frame-rate moving image as described above, the image projection system 100 performs image display processing. An example of a flow of the image display processing will be described with reference to a flowchart in FIG. 8.

When the image display processing starts, the image processing section 121 performs the image processing on an input image with a frame rate of 120 frames per second in step S101. The image processing suppresses the influence of superimposition of a plurality of frame images in a projection image. In step S102, the distribution section 122 distributes, to each projection apparatus 112, the image with a frame rate of 120 frames per second on which the image processing has been performed. In step S103, each projection apparatus 112 sequentially projects the respective frame images distributed thereto at a frame rate of 30 frames per second. When the projection of the images ends, the image display processing ends.

<Flow of Image Processing>

Figure 8:
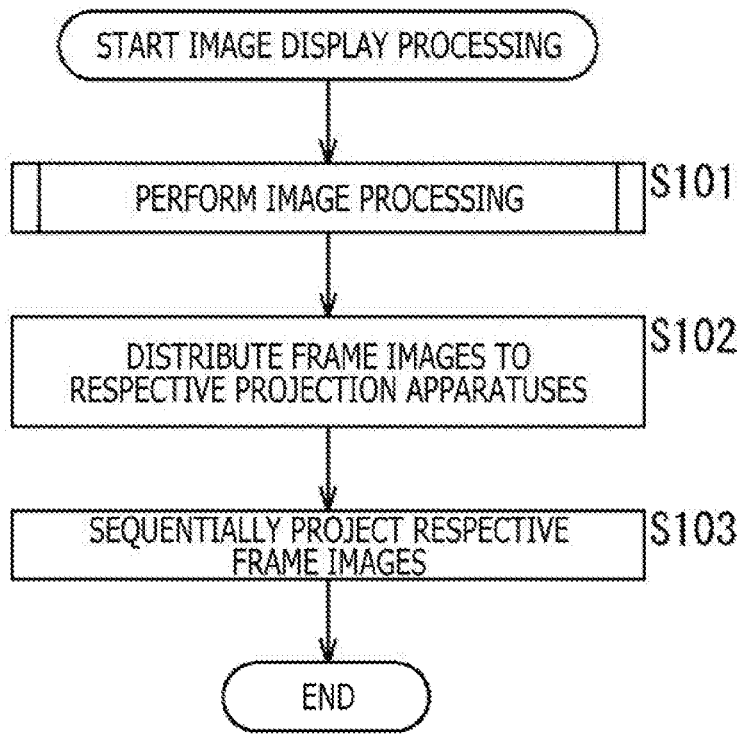
FIG. 8 is a flowchart for describing an example of a flow of image display processing.
Figure 9:
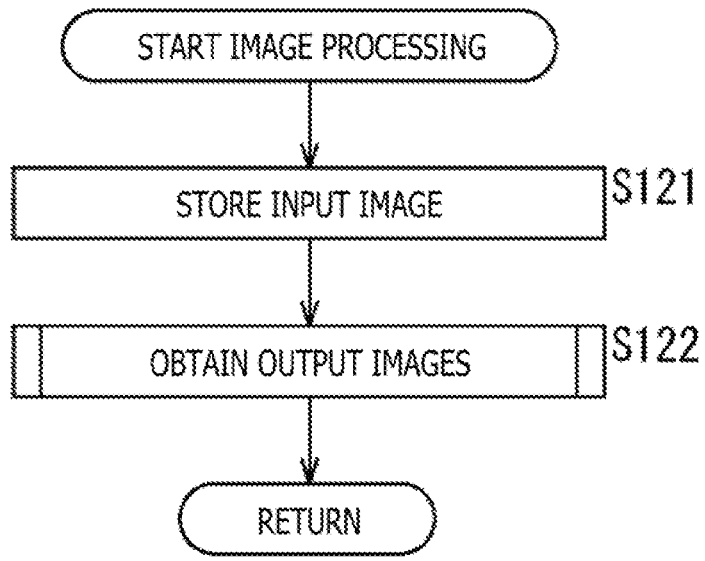
FIG. 9 is a flowchart for describing an example of a flow of image processing.

Next, an example of a flow of the image processing executed in step S101 in FIG. 8 will be described with reference to a flowchart in FIG. 9.

When the image processing starts, the storage section 131 of the image processing section 121 stores all frame images of the input moving image in step S121. In step S122, the output calculation section 132 uses the images stored in the storage section 131 to obtain respective output images, which are images to be projected by the respective projection apparatuses 112 at a frame rate of 120 frames per second. When the output images have been obtained, the image processing ends and the process returns to FIG. 8.

<Flow of Output Image Calculation Processing>

Figure 10:
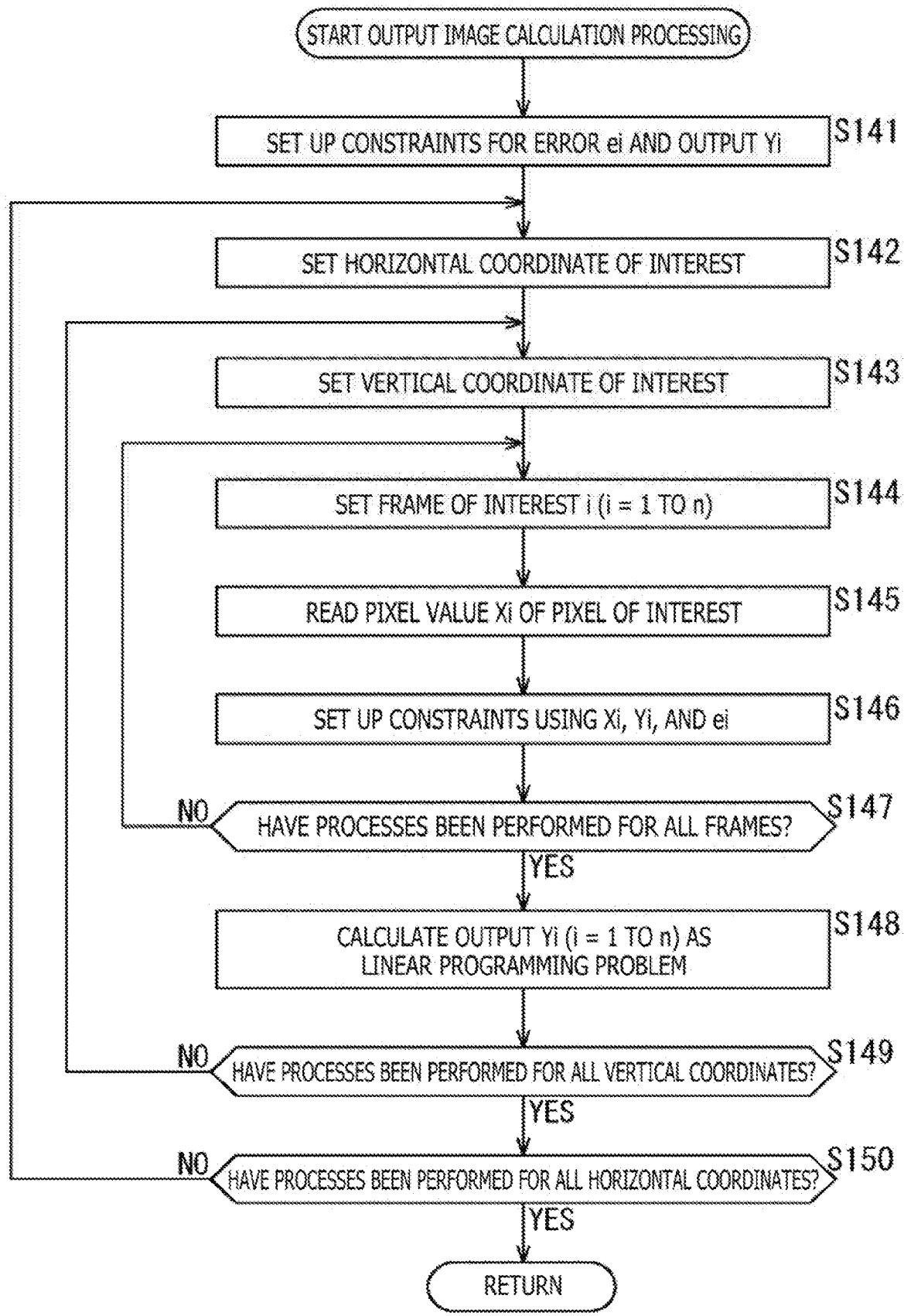
FIG. 10 is a flowchart for describing an example of a flow of output image calculation processing.

Next, an example of a flow of output image calculation processing executed in step S122 in FIG. 9 will be described with reference to a flowchart in FIG. 10.

When the output image calculation processing starts, the output calculation section 132 sets up the constraints for the error ei and the output Yi (for example, the formulas (8) and (10)) in step S141. In step S142, the output calculation section 132 sets a horizontal coordinate of interest from unprocessed horizontal coordinates. The horizontal coordinate of interest is a horizontal coordinate to be processed. In step S143, the output calculation section 132 sets a vertical coordinate of interest from unprocessed vertical coordinates. The vertical coordinate of interest is a vertical coordinate to be processed. Further, in step S144, the output calculation section 132 sets a frame of interest i (i=1 to n) from unprocessed frames. The frame of interest i is a frame to be processed.

In step S145, the output calculation section 132 reads the pixel value Xi of the pixel of interest from the storage section 131. In step S146, the output calculation section 132 uses the pixel value Xi, the pixel value Yi, and the error ei to set up the constraints (for example, the formulas (6) and (7)).

In step S146, the output calculation section 132 determines whether or not the processes have been performed for all the frames. In a case where it has been determined that an unprocessed frame exists, the process returns to step S144 and the subsequent processes are repeated. That is, each process in steps S144 to S147 is repeated for each frame. Then, in a case where it has been determined in step S147 that the processes have been performed for all the frames, the process proceeds to step S148.

In step S148, the output calculation section 132 calculates the output Yi (i=1 to n) as the linear programming problem using an arbitrary solution such as, for example, the internal point method, the simplex method, or the like.

In step S149, the output calculation section 132 determines whether or not the processes have been performed for all the vertical coordinates. In a case where it has been determined that an unprocessed vertical coordinate exists, the process returns to step S143 and the subsequent processes are repeated. That is, each process in step S143 to step S149 is repeated for each vertical coordinate. Then, in a case where it has been determined in step S149 that the processes have been performed for all the vertical coordinates, the process proceeds to step S150.

In step S150, the output calculation section 132 determines whether or not the processes have been performed for all the horizontal coordinates. In a case where it has been determined that an unprocessed horizontal coordinate exists, the process returns to step S142 and the subsequent processes are repeated. That is, each process in step S142 to step S150 is repeated for each horizontal coordinate. Then, in a case where it has been determined in step S150 that the processes have been performed for all the horizontal coordinates, the output image calculation processing ends and the process returns to FIG. 9.

By performing each process as described above, the image processing section 121 can correct each pixel value such that the error between the input image and the projection image is minimized. Therefore, the image projection system 100 can suppress the occurrence of the superimposition blur in the projection image. Further, in this case, since the duration of projection of each frame image by each projection apparatus 112 is not shortened, the image projection system 100 can also suppress a reduction in brightness of the projection image. That is, the image projection system 100 can suppress a reduction in subjective image quality.

It is noted that although the constraints are set up for all the pixels of each frame image to obtain the pixel values in the above description, the present embodiment is not limited thereto. A constraint may be set up for part of the pixels and the pixel value(s) may be obtained from the constraint for the part of the pixels. Alternatively, pixels whose pixel values are obtained from the linear programming may be part of the pixels of each frame image, and a predetermined function or the like may be used for interpolation for the remaining pixels. Further, although the constraints are set up for all the frames to obtain the pixel values in the above description, the present embodiment is not limited thereto. A constraint may be set up for part of the frames and the pixel values may be obtained from the constraint for the part of the frames.

3. Second Embodiment

<Filter Optimization and Linear Prediction Using Method of Least Squares>

It is noted that although the pixel values are obtained using the linear programming in the above description, the method of obtaining the pixel values is arbitrary and is not limited to the example described above. For example, a filter for correcting the pixel values of a corresponding frame image may be optimized such that the error (difference value) between the input image and the projection image is minimized and the frame image may be corrected using the optimized filter. Further, at this time, the filter may be optimized by the method of least squares using an image prepared in advance as a learning sample such that the error is minimized.

Figure 11:
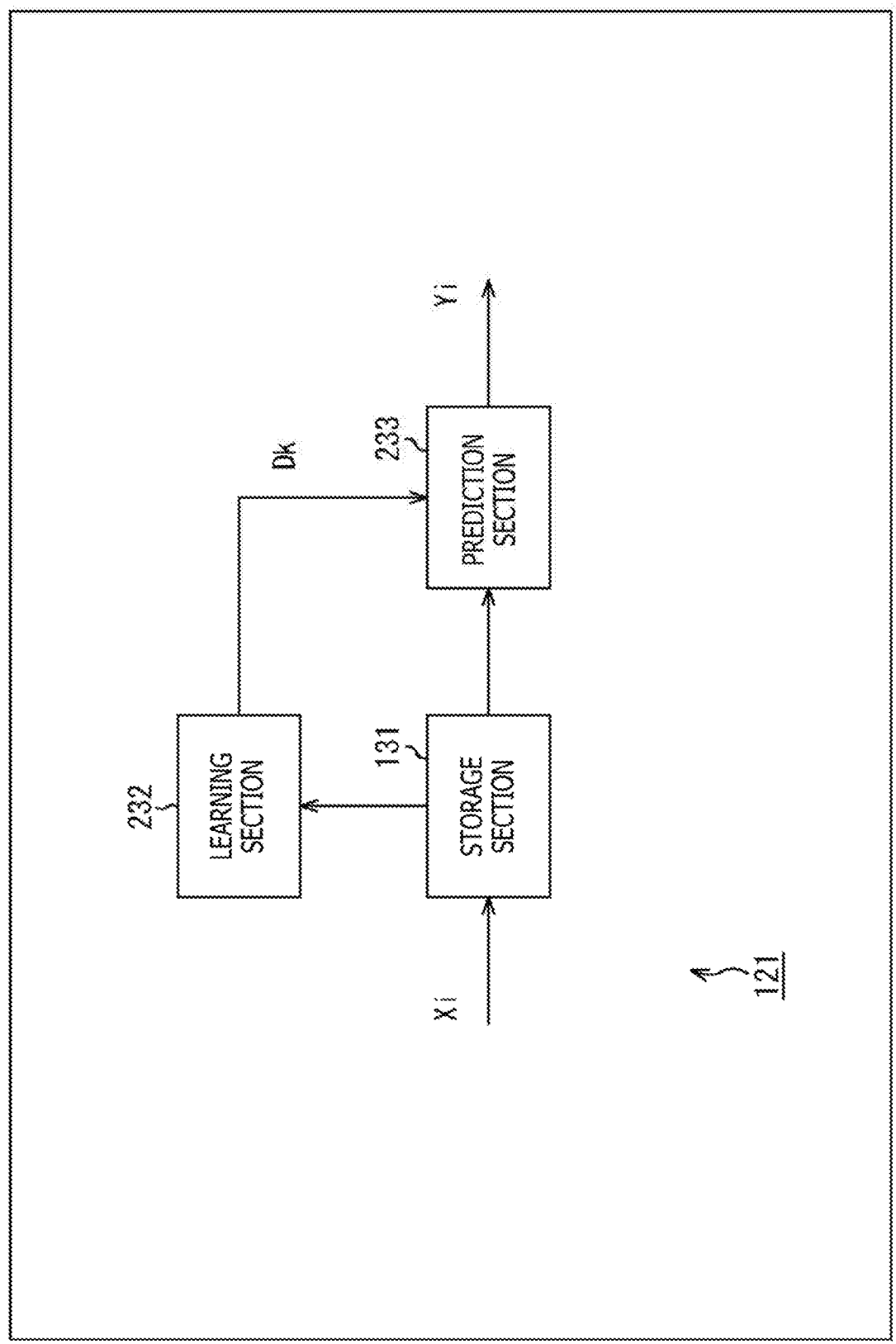
FIG. 11 is a block diagram illustrating an example of the image processing section.

FIG. 11 is a block diagram illustrating an example of the main configuration of the image processing section 121 in this case. As illustrated in FIG. 11, the image processing section 121 in this case includes the storage section 131, a learning section 232, and a prediction section 233. As in the first embodiment, the storage section 131 stores all frame images of an input moving image. Further, the storage section 131 supplies the stored pixel value Xi to the learning section 232 and the prediction section 233 at a predetermined timing or on the basis of a request from the outside such as the learning section 232, the prediction section 233, or the like.

Figure 12:
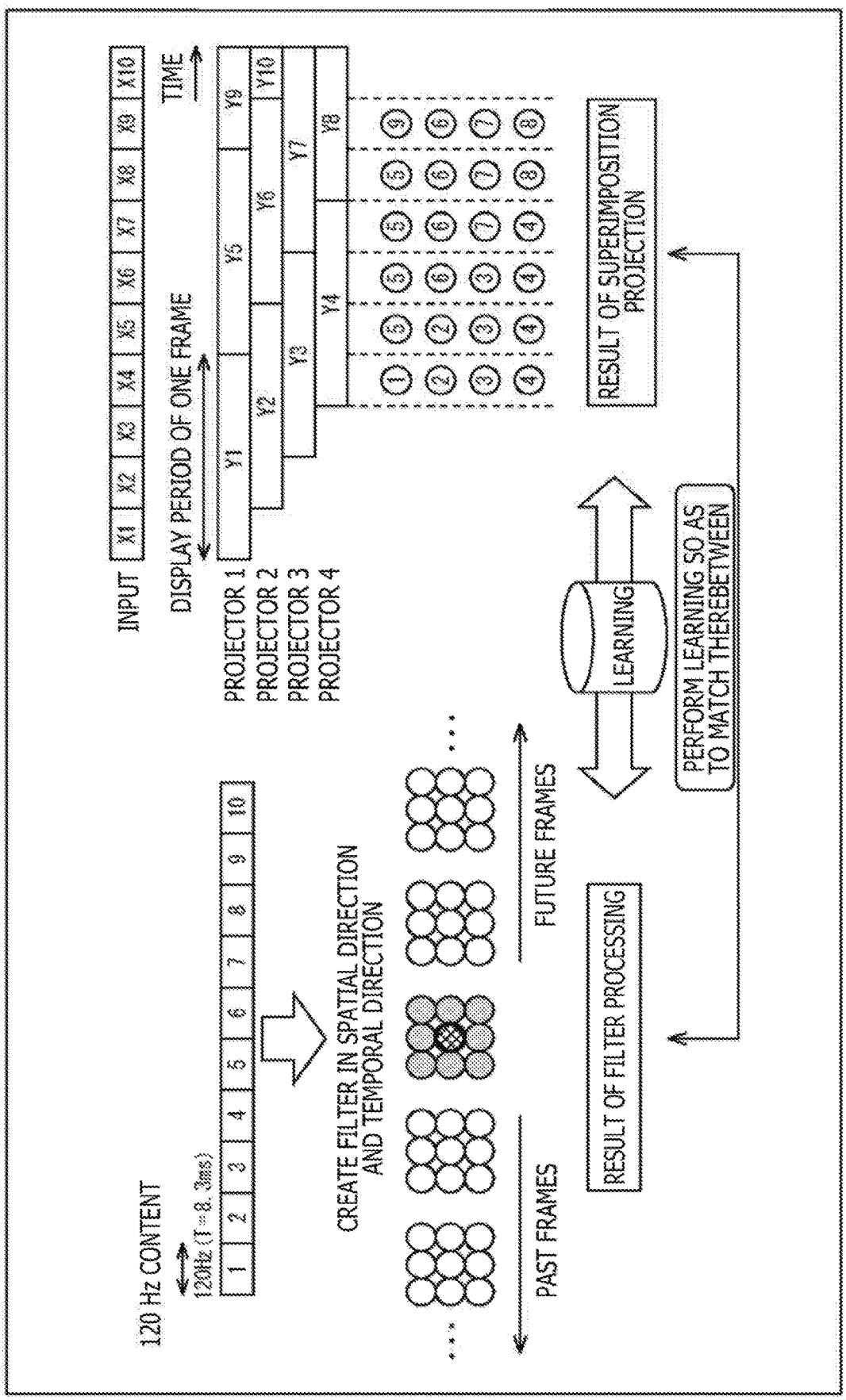
FIG. 12 is a diagram for describing an example of how image projection is performed.

The learning section 232 performs processing related to learning processing for optimizing the filter. For example, as illustrated in FIG. 12, the learning section 232 forms the filter in the spatial direction and the temporal direction using a predetermined moving image prepared in advance as the learning sample, and performs filter processing on the learning sample using the filter. Then, the learning section 232 performs the learning processing such that the result of the filter processing matches the projection image.

Figure 13:
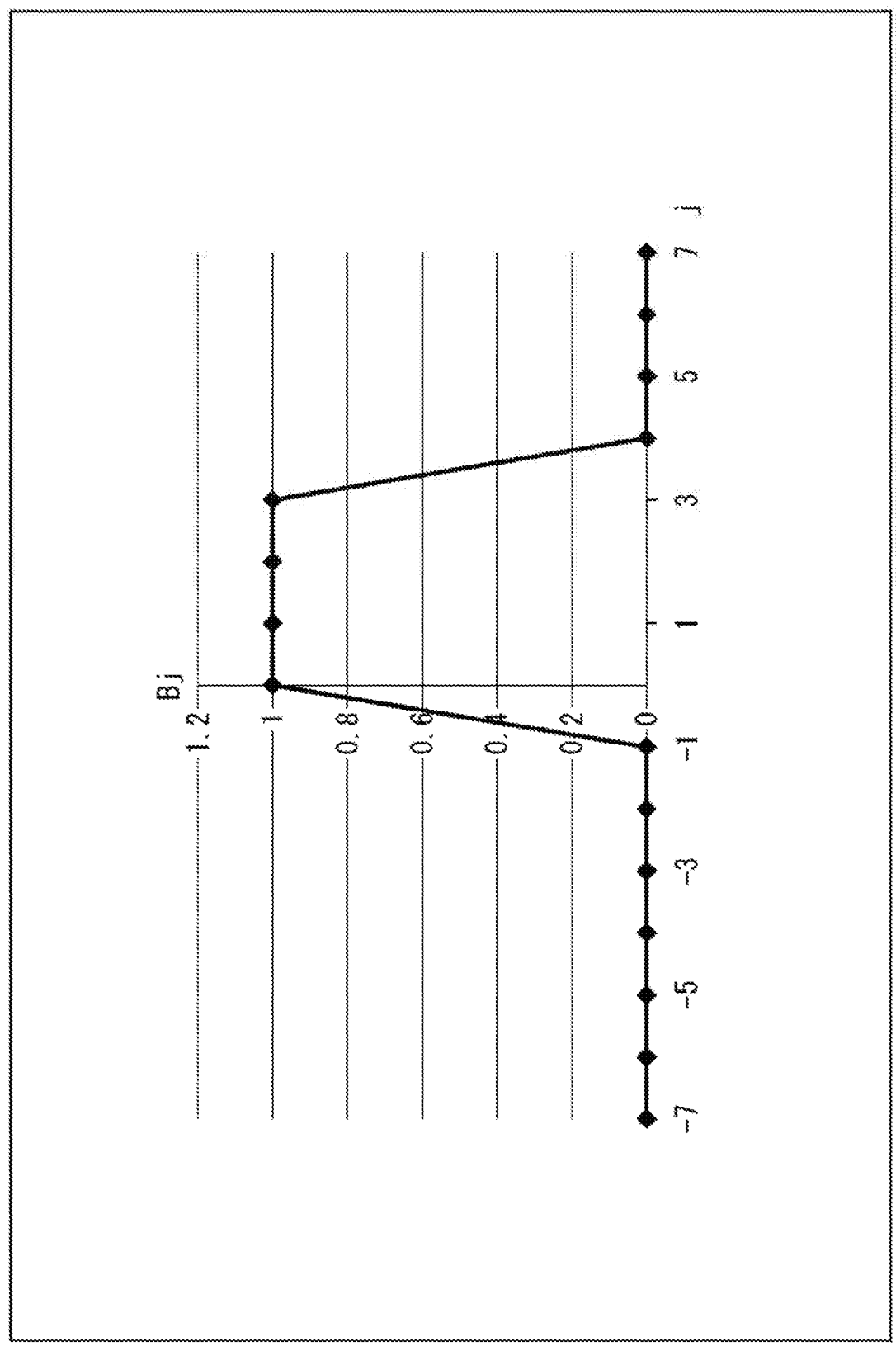
FIG. 13 is a diagram illustrating an example of a coefficient B.

The above-described formula (2) can also be expressed as the following formula (11) where Bj=1. FIG. 13 illustrates an example of the value of Bj.

$$Z_i = \sum_{j=0}^{3} B_j \cdot Y_{i+j} \tag{11}$$

Similarly, in a case where the pixel value Yi of the output image is expressed by a linear combination of the pixel value Xi of the input image, the pixel value Yi of the output image can be expressed as the following formula (12).

$$Y_i = \sum_{k=-m}^{m} D_k \cdot X_{i+k} \tag{12}$$

The pixel value Zi can be expressed as the following formula (13) using the pixel value Xi from the formulas (11) and (12) described above.

$$Z_i = \sum_{j=0}^{3} B_j \cdot \sum_{k=-m}^{m} D_k \cdot X_{i+j+k} \tag{13}$$

As in the case of the first embodiment, the error ei between the input image and the projection image needs to be minimized in order to optimize the pixel value Yi of the output image such that the pixel value Zi of the projection image projected on the screen 113 matches (a constant multiple of) the pixel value Xi of the input image. As described above, the pixel value Zi can be expressed as the following formula (14) using the error ei.

$$Z_i = 4X_i + e_i \tag{14}$$

The error ei can be expressed as the following formula (15) from the formulas (13) and (14).

$$e_i = \sum_{j=0}^{3} B_j \cdot \sum_{k=-m}^{m} D_k \cdot X_{i+j+k} - 4X_i \tag{15}$$

Therefore, using the moving image prepared in advance as the learning sample, the learning section 232 sets up a minimization function as the following formula (16) where a known value is Bi, a variable is Di, and the learning sample is Xi,s, and calculates a coefficient Dk by the method of least squares.

$$\min: \sum_{s}^{sample} e_{i,s}^2 = \sum_{s}^{sample} \left( \sum_{j=0}^{3} B_j \cdot \sum_{k=-m}^{m} D_k \cdot X_{i+j+k,s} - 4X_{i,s} \right)^2 \tag{16}$$

Figures 14A, 14B:
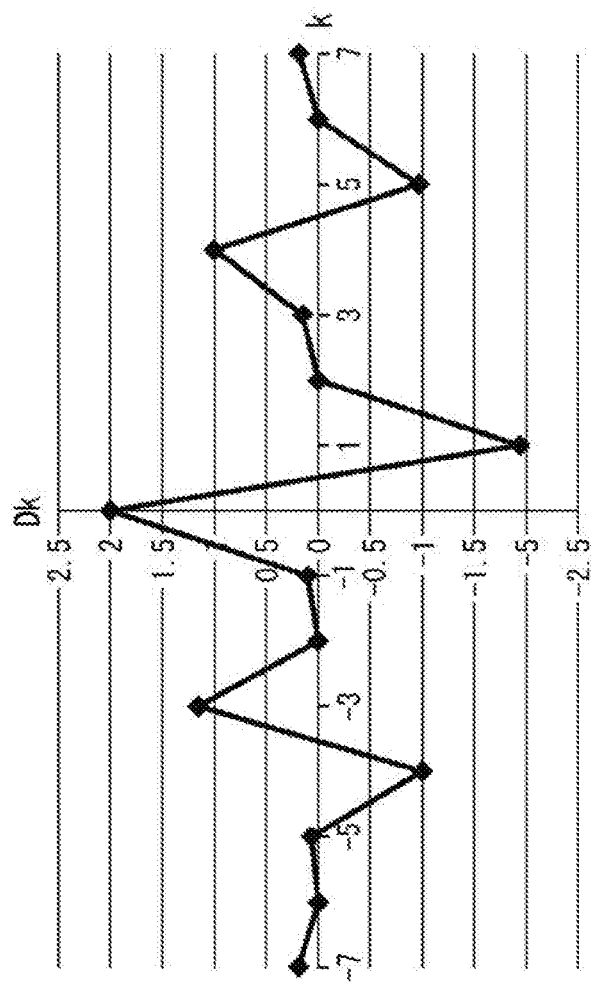
FIGS. 14A and 14B are diagrams illustrating an example of a coefficient Dk.

FIGS. 14A and 14B illustrate an example of calculation of the coefficient Dk in the case of m=7. In FIG. 14A, the value of the coefficient Dk is illustrated for each k in a table, which is made into a graph in FIG. 14B.

The learning section 232 supplies the coefficient Dk, which has been obtained as the learning result, to the prediction section 233.

The prediction section 233 performs processing related to prediction computation for predicting (the pixel value Yi of) the output image from (the pixel value Xi of) the input image. For example, the prediction section 233 substitutes the coefficient Dk supplied from the learning section 232 into the formula (12) to predict the pixel value Yi from the pixel value Xi using the formula (12). The prediction section 233 performs the prediction computation for each of the coordinates of interest in a similar manner and calculates the pixel value Yi for each. In this manner, each pixel value Yi of the output image can be obtained such that the error (difference value) between the projection image and the input image is minimized. The prediction section 233 supplies the output image (pixel value Yi) to the distribution section 122 at a frame rate of 120 frames per second.

The distribution section 122 sequentially distributes the frame images on which the image processing has been performed (pixel values have been corrected) in this manner by the image processing section 121 to the respective projection apparatuses 112. Each of the projection apparatuses 112 sequentially projects the frame images distributed thereto to the screen 113 at a frame rate of 30 frames per second. In this manner, the projection image projected on the screen 113 has a minimum error with respect to the corresponding input image without reducing the brightness. Therefore, it is possible to suppress a reduction in subjective image quality.

It is noted that in this case as well, the section of the frame numbers i=1, 2, and 3 is where the four frame images have not been superimposed in the projection image, and therefore is not included in the constraints above. Another constraint may be set up to perform calculation for this section. In this manner, a reduction in subjective image quality can be suppressed from the first frame. Alternatively, the image processing for this section may be omitted. In this manner, it is possible to suppress an increase in load that would otherwise be caused by performing the image processing.

<Flow of Image Display Processing>

Next, a flow of processing executed in this image projection system 100 will be described. In this case as well, in a case where the image projection system 100 projects a high-frame-rate moving image as described above, the image projection system 100 performs image display processing. Since the image display processing is similar to the image display processing described in the first embodiment, a description thereof is omitted.

<Flow of Image Processing>

Figure 15:
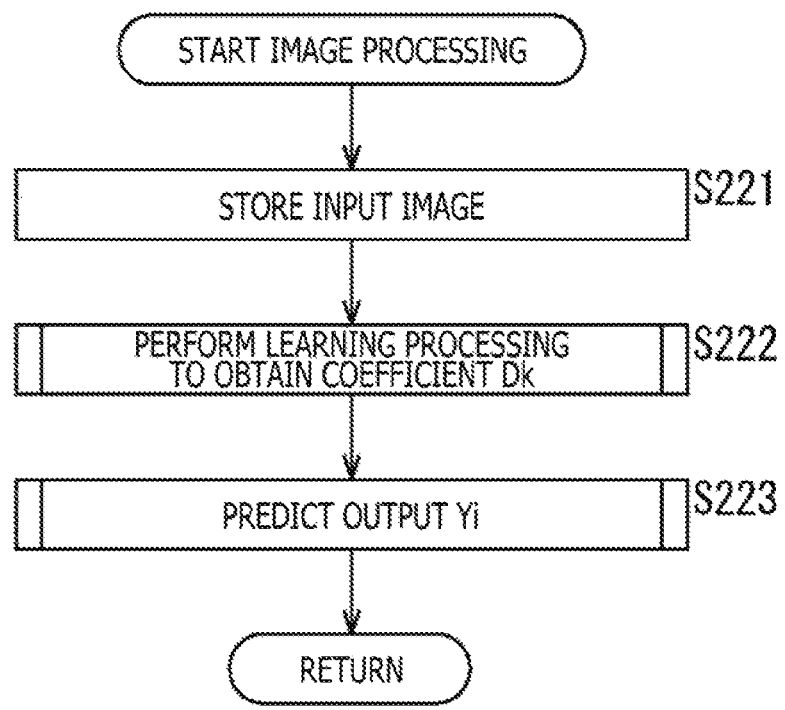
FIG. 15 is a flowchart illustrating an example of a flow of image processing.

Next, an example of a flow of the image processing executed in step S101 in FIG. 8 will be described for this case with reference to a flowchart in FIG. 15.

When the image processing starts, a moving image prepared in advance is input as a learning sample. In step S221, the storage section 131 of the image processing section 121 stores all frame images of the moving image. In step S222, the learning section 232 performs the learning processing to obtain the coefficient Dk. In step S223, the prediction section 233 performs prediction processing for predicting the pixel value Yi of each output image using the coefficient Dk obtained in step S222. When the output images have been obtained, the image processing ends and the process returns to FIG. 8.

<Flow of Learning Processing>

Figure 16:
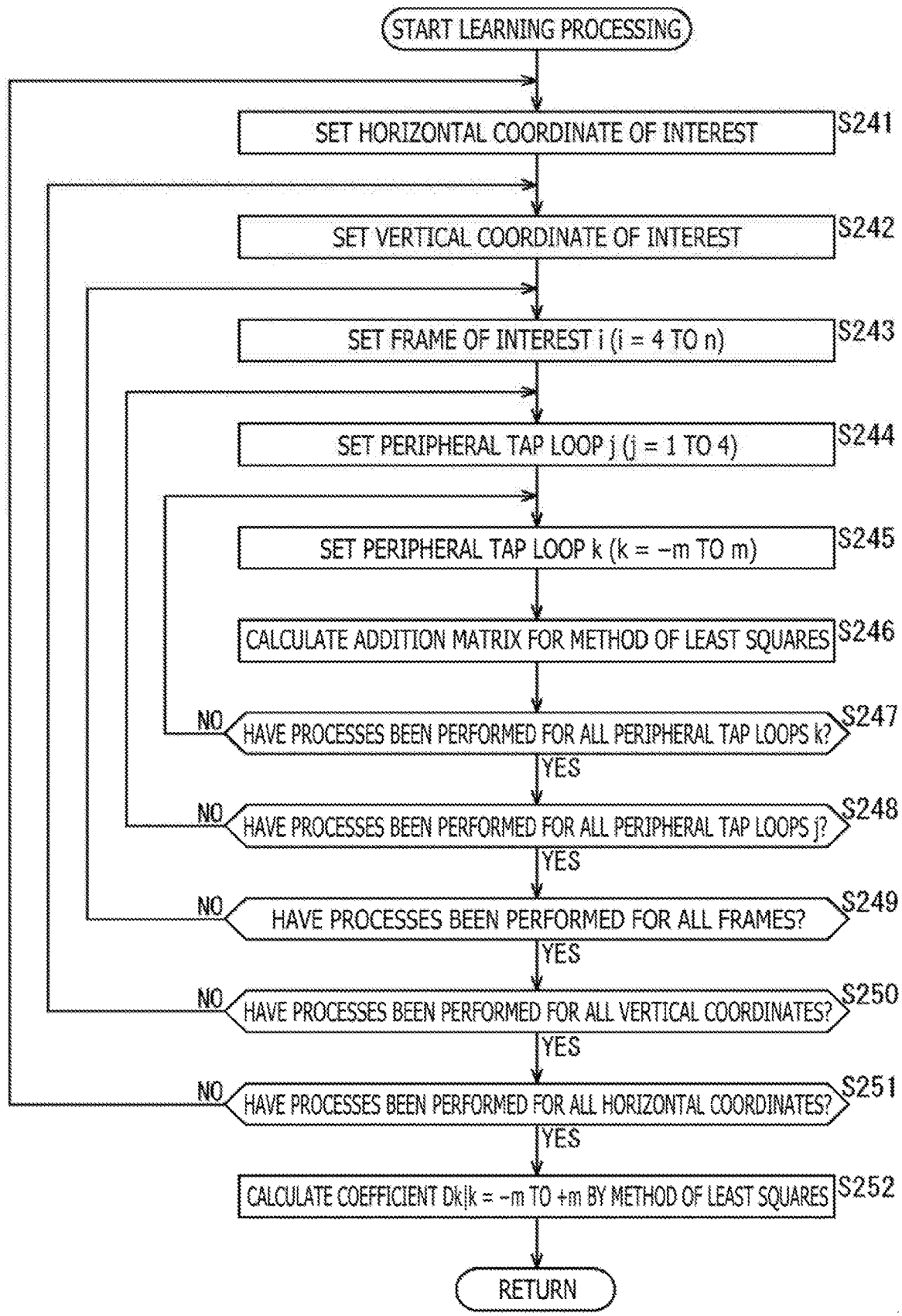
FIG. 16 is a flowchart for describing an example of a flow of learning processing.

Next, an example of a flow of the learning processing executed in step S222 in FIG. 15 will be described with reference to a flowchart in FIG. 16.

When the learning processing starts, the learning section 232 sets a horizontal coordinate of interest from unprocessed horizontal coordinates of the frame images of the learning sample in step S241. The horizontal coordinate of interest is a horizontal coordinate to be processed. In step S242, the learning section 232 sets the vertical coordinate of interest from unprocessed vertical coordinates of the frame images of the learning sample. The vertical coordinate of interest is the vertical coordinate to be processed. In step S243, the learning section 232 sets a frame of interest i (i=4 to n) from unprocessed frames of the learning sample. The frame of interest i is a frame to be processed. In step S244, the learning section 232 sets a peripheral tap loop j (j=1 to 4). In step S245, the learning section 232 sets a peripheral tap loop k (k=−m to m).

In step S246, the learning section 232 calculates an addition matrix for the method of least squares. That is, the learning section 232 sets up the formula (16).

In step S247, the learning section 232 determines whether or not the processes have been performed for all the peripheral tap loops k. In a case where it has been determined that an unprocessed peripheral tap loop k exists, the process returns to step S245 and the subsequent processes are repeated. That is, each process in steps S245 to S247 is repeated for each peripheral tap loop k. Then, in a case where it has been determined in step S247 that the processes have been performed for all the peripheral tap loops k, the process proceeds to step S248.

In step S248, the learning section 232 determines whether or not the processes have been performed for all the peripheral tap loops j. In a case where it has been determined that an unprocessed peripheral tap loop j exists, the process returns to step S244 and the subsequent processes are repeated. That is, each process in steps S244 to S248 is repeated for each peripheral tap loop j. Then, in a case where it has been determined in step S248 that the processes have been performed for all the peripheral tap loops j, the process proceeds to step S249.

In step S249, the learning section 232 determines whether or not the processes have been performed for all the frames. In a case where it has been determined that an unprocessed frame exists, the process returns to step S243 and the subsequent processes are repeated. That is, each process in steps S243 to S249 is repeated for each frame. Then, in a case where it has been determined in step S249 that the processes have been performed for all the frames, the process proceeds to step S250.

In step S250, the learning section 232 determines whether or not the processes have been performed for all the vertical coordinates. In a case where it has been determined that an unprocessed vertical coordinate exists, the process returns to step S242 and the subsequent processes are repeated. That is, each process in steps S242 to S250 is repeated for each vertical coordinate. Then, in a case where it has been determined in step S250 that the processes have been performed for all the vertical coordinates, the process proceeds to step S251.

In step S251, the learning section 232 determines whether or not the processes have been performed for all the horizontal coordinates. In a case where it has been determined that an unprocessed horizontal coordinate exists, the process returns to step S241 and the subsequent processes are repeated. That is, each process in steps S241 to S251 is repeated for each horizontal coordinate. Then, in a case where it has been determined in step S251 that the processes have been performed for all the horizontal coordinates, the process proceeds to step S252.

In step S252, the learning section 232 solves the addition matrix for the method of least squares calculated in step S246 by the method of least squares, and calculates the coefficient Dk (k=−m to +m). When the coefficient Dk has been calculated, the learning processing ends and the process returns to FIG. 15.

<Flow of Prediction Processing>

Figure 17:
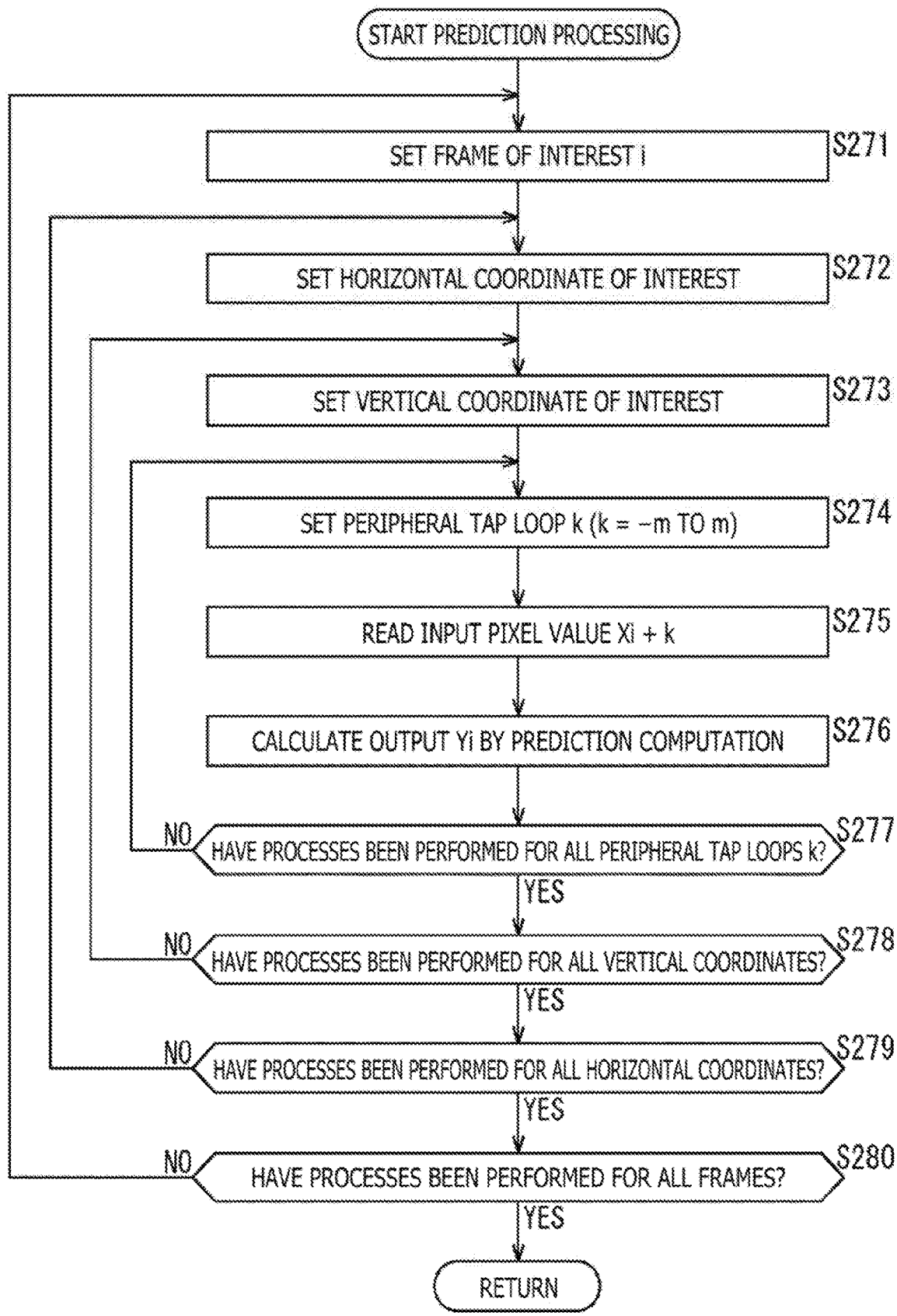
FIG. 17 is a flowchart for describing an example of a flow of prediction processing.

Next, an example of a flow of the prediction processing executed in step S223 in FIG. 15 will be described with reference to a flowchart in FIG. 17.

When the prediction processing starts, the prediction section 233 sets a frame of interest i from unprocessed frames of the input image in step S271. The input image is the moving image content to be projected by the projection apparatuses 112. The frame of interest i is a frame to be processed. In step S272, the prediction section 233 sets a horizontal coordinate of interest from unprocessed horizontal coordinates of the frame image of the input image. The horizontal coordinate of interest is a horizontal coordinate to be processed. In step S273, the prediction section 233 sets a vertical coordinate of interest from unprocessed vertical coordinates of the frame image of the input image. The vertical coordinate of interest is a vertical coordinate to be processed.

In step S274, the prediction section 233 sets a peripheral tap loop k (k=−m to m). In step S275, the prediction section 233 reads an input pixel value $X_{i+k}$. In step S276, the prediction section 233 calculates the output Yi by prediction computation. That is, the prediction section 233 substitutes the coefficient Dk obtained by the learning processing in FIG. 16 into the formula (12) to obtain the output Yi using the formula (12).

In step S277, the prediction section 233 determines whether or not the processes have been performed for all the peripheral tap loops k. In a case where it has been determined that an unprocessed peripheral tap loop k exists, the process returns to step S274 and the subsequent processes are repeated. That is, each process in steps S274 to S277 is repeated for each peripheral tap loop k. Then, in a case where it has been determined in step S277 that the processes have been performed for all the peripheral tap loops k, the process proceeds to step S278.

In step S278, the prediction section 233 determines whether or not the processes have been performed for all the vertical coordinates. In a case where it has been determined that an unprocessed vertical coordinate exists, the process returns to step S273 and the subsequent processes are repeated. That is, each process in steps S273 to S278 is repeated for each vertical coordinate. Then, in a case where it has been determined in step S278 that the processes have been performed for all the vertical coordinates, the process proceeds to step S279.

In step S279, the prediction section 233 determines whether or not the processes have been performed for all the horizontal coordinates. In a case where it has been determined that an unprocessed horizontal coordinate exists, the process returns to step S272 and the subsequent processes are repeated. That is, each process in steps S272 to S279 is repeated for each horizontal coordinate. Then, in a case where it has been determined in step S279 that the processes have been performed for all the horizontal coordinates, the process proceeds to step S280.

In step S280, the prediction section 233 determines whether or not the processes have been performed for all the frames. In a case where it has been determined that an unprocessed frame exists, the process returns to step S271 and the subsequent processes are repeated. That is, each process in steps S271 to S280 is repeated for each frame. Then, in a case where it has been determined in step S280 that the processes have been performed for all the frames, the prediction processing ends and the process returns to FIG. 15.

By performing each process as described above, the image processing section 121 can correct each pixel value such that the error between the input image and the projection image is minimized. Therefore, the image projection system 100 can suppress the occurrence of the superimposition blur in the projection image. Further, in this case, since the duration of projection of each frame image by each projection apparatus 112 is not shortened, the image projection system 100 can also suppress a reduction in brightness of the projection image. That is, the image projection system 100 can suppress a reduction in subjective image quality.

It is noted that the image projection system 100 can project the high-frame-rate video using the low-frame-rate projection apparatuses 112 by performing image projection as described above. Therefore, high-frame-rate projection can be realized more inexpensively. Further, as described above, the image projection system 100 can suppress a reduction in subjective image quality only through conversion of video signals by the image processing section 121 without requiring a special viewing apparatus such as glasses. That is, the image projection system 100 can more easily and inexpensively suppress a reduction in subjective image quality. In addition, increasing the number of projection apparatuses 112 allows the image projection system 100 to realize image projection of an even higher frame rate.

It is noted that in the above description, although learning and prediction are performed for all the pixels of each frame image, the present embodiment is not limited thereto. The above-described learning and prediction may be performed for part of the pixels. In this case, learning and prediction may be performed a plurality of times for the frame image. Alternatively, a predetermined function or the like may be used to provide pixels for interpolation without performing learning and prediction.

4. Third Embodiment

<Other Configurations>

It is noted that the configuration of the image projection system 100 to which the present technology is applied is not limited to the above-described example in FIG. 5. For example, each of the number of central processing units 111 and the number of projection apparatuses 112 is arbitrary. For example, there may be a plurality of central processing units 111. The number of projection apparatuses 112 may be three or smaller or may be five or greater. Further, the specifications (for example, the resolution, brightness, frame rate, and the like) of the respective projection apparatuses 112 may or may not be all the same.

Figure 18:
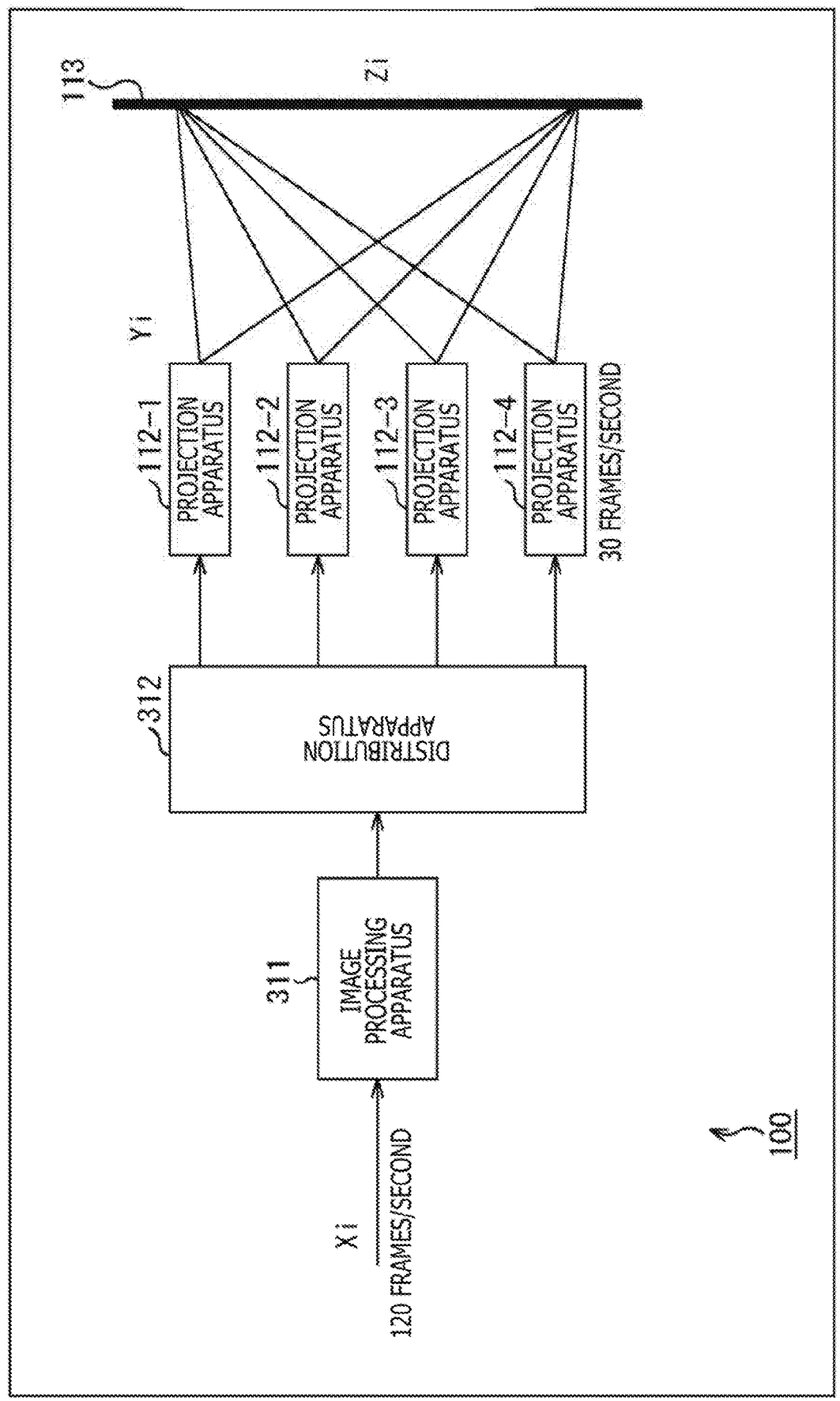
FIG. 18 is a block diagram illustrating an example of the main configuration of the image projection system.

Further, as illustrated in FIG. 18, for example, each of the image processing section 121 and the distribution section 122 of the central processing unit 111 may be an independent apparatus, and instead of the central processing unit 111, the image projection system 100 may include an image processing apparatus 311 and a distribution apparatus 312.

Figure 19:
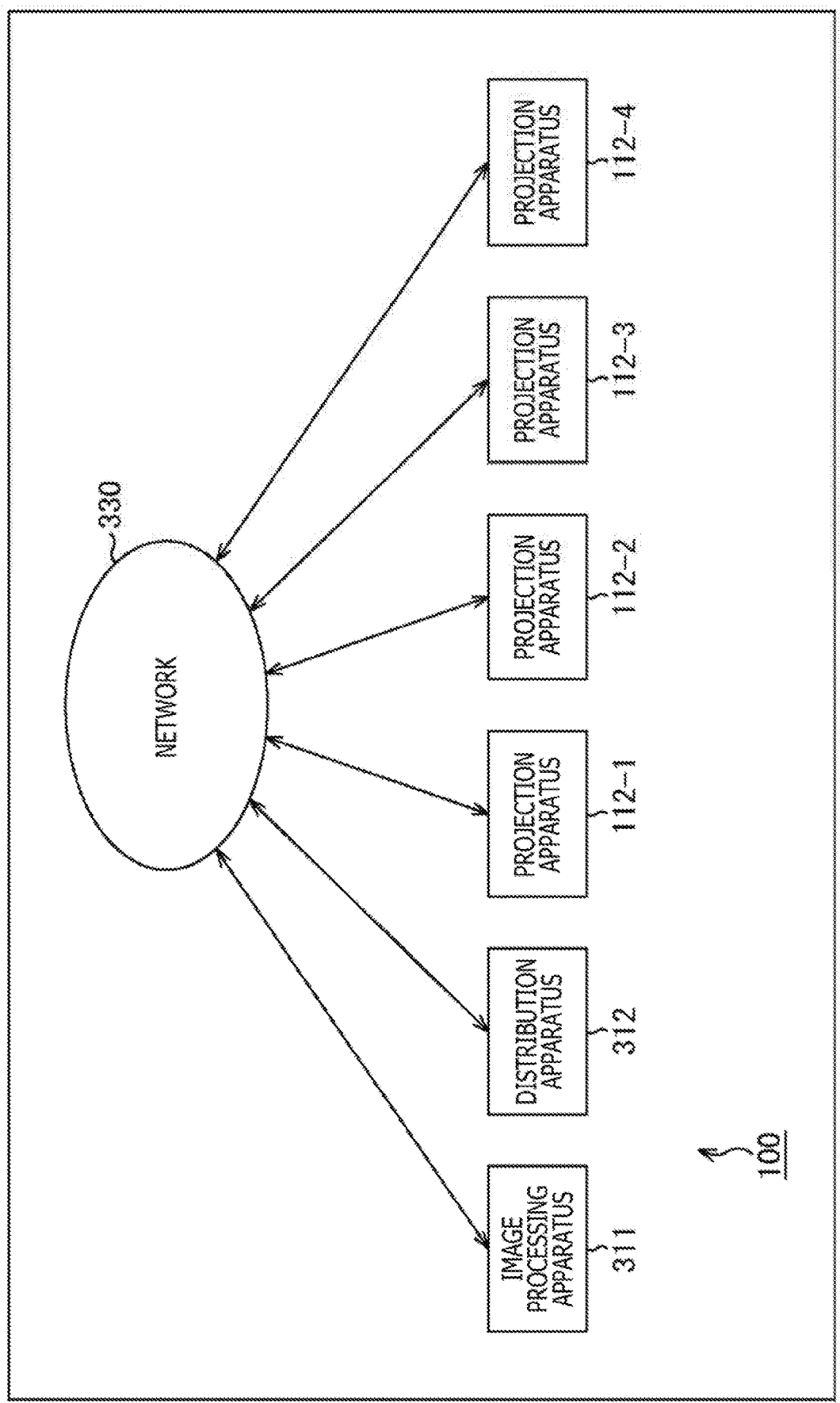
FIG. 19 is a block diagram illustrating another example of the main configuration of the image projection system.

Further, as illustrated in FIG. 19, each apparatus may be mutually connected via a network 330. In an example in FIG. 19, the image processing apparatus 311, the distribution apparatus 312, and each projection apparatus 112 in FIG. 18 are connected to each other via the network 330.

This network 330 is an arbitrary communication network. A communication method employed by the network 330 is arbitrary and may be wired communication, wireless communication, or both thereof, for example. Further, the network 330 may include a single communication network or may include a plurality of communication networks. For example, the network 330 may include communication networks and/or communication paths conforming to arbitrary communication standards such as: the Internet; a public switched telephone network; a wide area communication network for wireless mobile terminals such as a so-called 3G network or 4G network; a WAN (Wide Area Network); a LAN (Local Area Network); a wireless communication network for performing communication conforming to the Bluetooth (registered trademark) standard; a communication path for near field communication such as NFC (Near Field Communication); a communication path for infrared communication; and a communication network of wired communication conforming to the standard such as an HDMI (registered trademark) (High-Definition Multimedia Interface) or a USB (Universal Serial Bus).

The apparatuses are each communicably connected to the network 330. It is noted that this connection may be wired (that is, connection via wired communication), wireless (that is, connection via wireless communication), or both thereof. The apparatuses can each communicate (transmit and receive information and the like) with each other via the network 330. In other words, the apparatuses may be each connected to each other via another equipment (an apparatus, a transmission path, or the like) so as to be communicable with each other. With such a configuration as well, the present technology can be applied to the image projection system 100 as in the case of the other embodiments described above, and the image projection system 100 can provide the functional effects described above.

It is noted that in the example in FIG. 19, the central processing unit 111 in FIG. 5 may be provided instead of the image processing apparatus 311 and the distribution apparatus 312.

Figure 20:
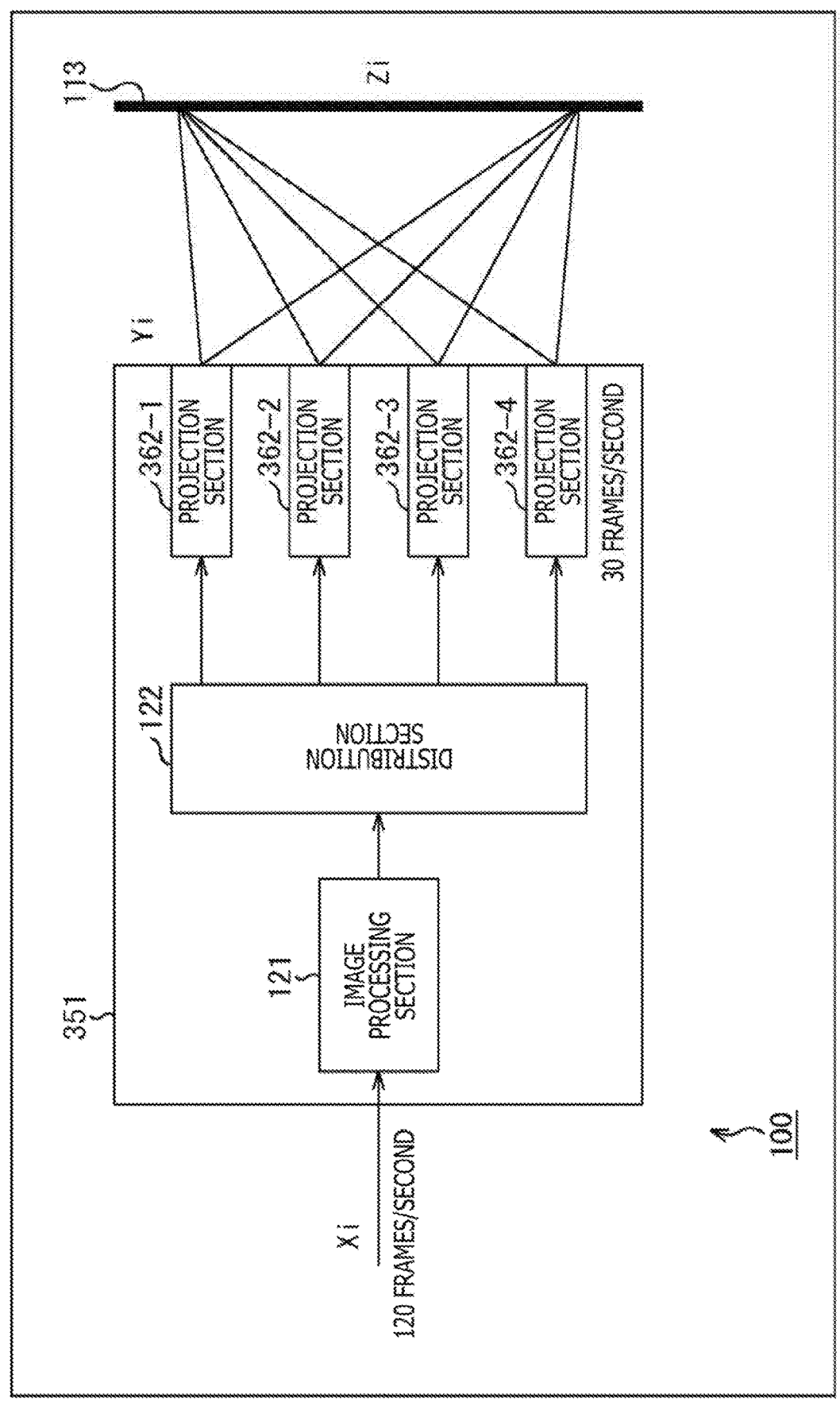
FIG. 20 is a block diagram illustrating still another example of the main configuration of the image projection system.

Further, for example, the entire configuration of the image projection system 100 may be configured as a single apparatus, as illustrated in FIG. 20. An image projection apparatus 351 illustrated in FIG. 20 includes the image processing section 121, the distribution section 122, and projection sections 362-1 to 362-4.

The projection sections 362-1 to 362-4 are processing sections similar to each other. In a case where the projection sections 362-1 to 362-4 do not need to be distinguished from each other in the description, the projection sections 362-1 to 362-4 will be referred to as projection sections 362. Each projection section 362 performs similar processing as the projection apparatus 112 and projects frame images distributed thereto.

Therefore, the present technology can be applied to the image projection apparatus 351 as in the case of the image projection system 100, and the image projection apparatus 351 can provide the functional effects described above. Needless to say, a configuration of the image projection apparatus 351 is arbitrary and is not limited to the example in FIG. 20. For example, each of the number of image processing sections 121, the number of distribution sections 122, and the number of projection sections 362 is arbitrary. Further, the specifications (for example, the resolution, brightness, frame rate, and the like) of the respective projection apparatuses 112 may or may not be all the same.

Figure 21:
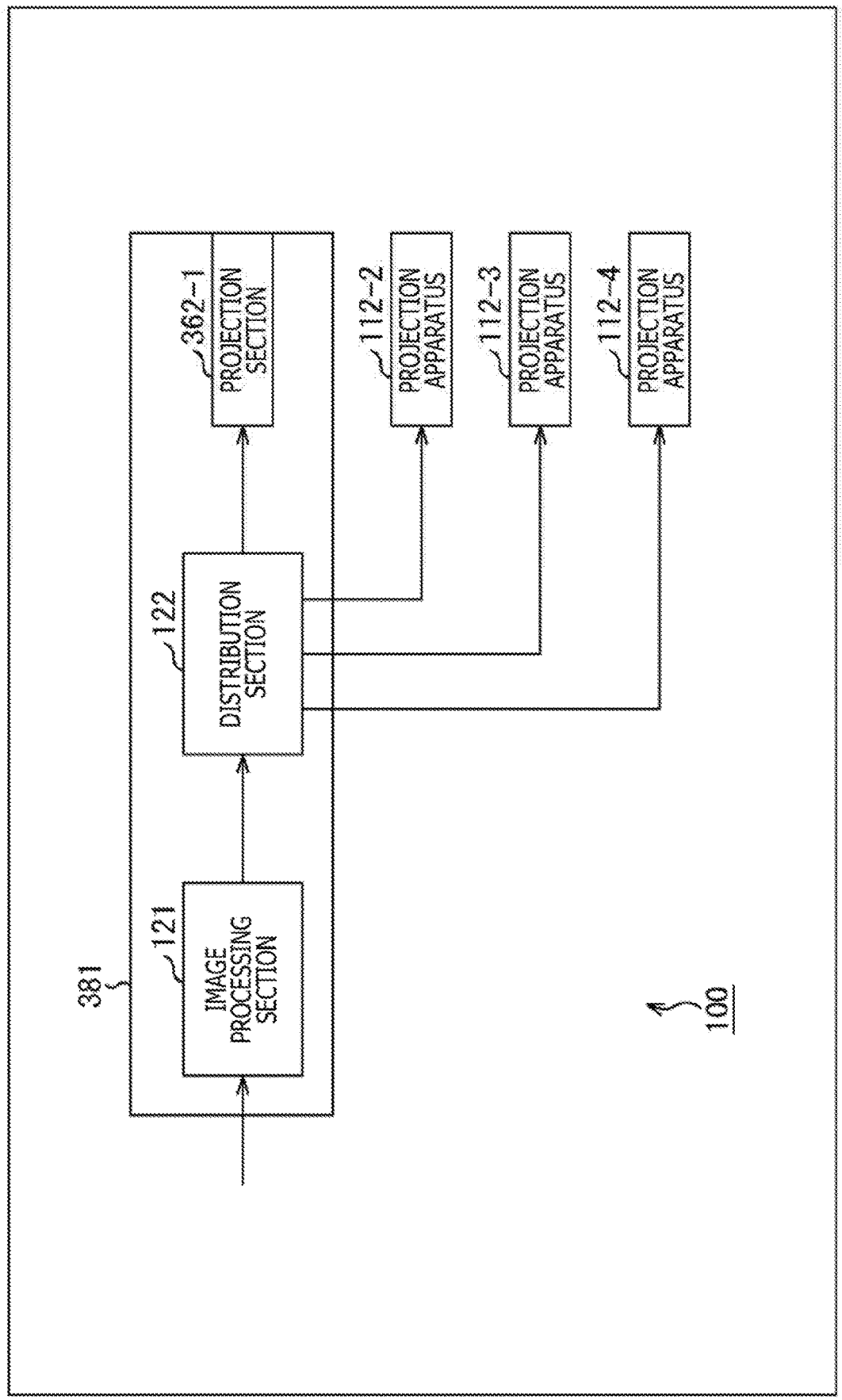
FIG. 21 is a block diagram illustrating yet another example of the main configuration of the image projection system.

Further, for example, the image processing section 121, the distribution section 122, and part of the projection apparatuses 112 may be configured as a single apparatus, as illustrated in FIG. 21. An image projection apparatus 381 illustrated in FIG. 21 includes the image processing section 121, the distribution section 122, and the projection section 362-1. Not only the projection section 362-1 incorporated in the image projection apparatus 381 but also the external projection apparatus 112-1, projection apparatus 112-3, and projection apparatus 112-4 are connected to the distribution section 122. The distribution section 122 cyclically distributes each frame image supplied from the image processing section 121 to the corresponding one of the projection section 362-1 and the projection apparatuses 112-1 to 112-4. The present technology can also be applied to such an image projection apparatus 381 as in the case of the image projection system 100, and the image projection apparatus 381 can provide the functional effects described above.

5. Others

<Frame Rate>

Further, although the frame rate of the input image is 120 frames per second in the above description, the frame rate is arbitrary and is not limited to this example. Further, although the frame rate of image projection by each of the projection apparatuses 112 (or the projection sections 362) is 30 frames per second in the above description, the frame rate is also arbitrary and is not limited to this example. For example, the frame rate of the input image may be different from the frame rate of the projection image.

<Fields of Application of Present Technology>

The present technology can be applied to systems, apparatuses, processing sections, and the like that are used in arbitrary fields such as, for example, traffic, medical care, crime prevention, agriculture, livestock industry, mining industry, beauty, factories, home electronics, meteorology, and natural surveillance, as long as the systems, apparatuses, processing sections, and the like are used for image processing.

For example, the present technology can also be applied to systems and devices used for viewing. Further, for example, the present technology can also be applied to systems and devices used for traffic management. In addition, for example, the present technology can also be applied to systems and devices used for security. Further, for example, the present technology can also be applied to systems and devices used for sports. In addition, for example, the present technology can also be applied to systems and devices used for agriculture. Further, for example, the present technology can also be applied to systems and devices used for the livestock industry. In addition, for example, the present technology can also be applied to systems and devices for monitoring the state of nature such as volcanoes, forests, and oceans. Further, for example, the present technology can be applied to meteorological observation systems and meteorological observation apparatuses for observing weather, temperature, humidity, wind speed, daylight hours, and the like. In addition, for example, the present technology can also be applied to systems, devices, and the like for observing the ecology of wildlife such as birds, fish, reptiles, amphibians, mammals, insects, and plants.

<Software>

The series of processes described above can be executed by hardware or software. Further, part of the processes can be executed by hardware while the other processes can be executed by software. In a case where the series of processes is executed by software, a program constituting the software is installed in a computer. Here, examples of the computer include a computer incorporated into dedicated hardware and a general-purpose personal computer, for example, capable of executing various kinds of functions with various kinds of programs installed therein.

Figure 22:
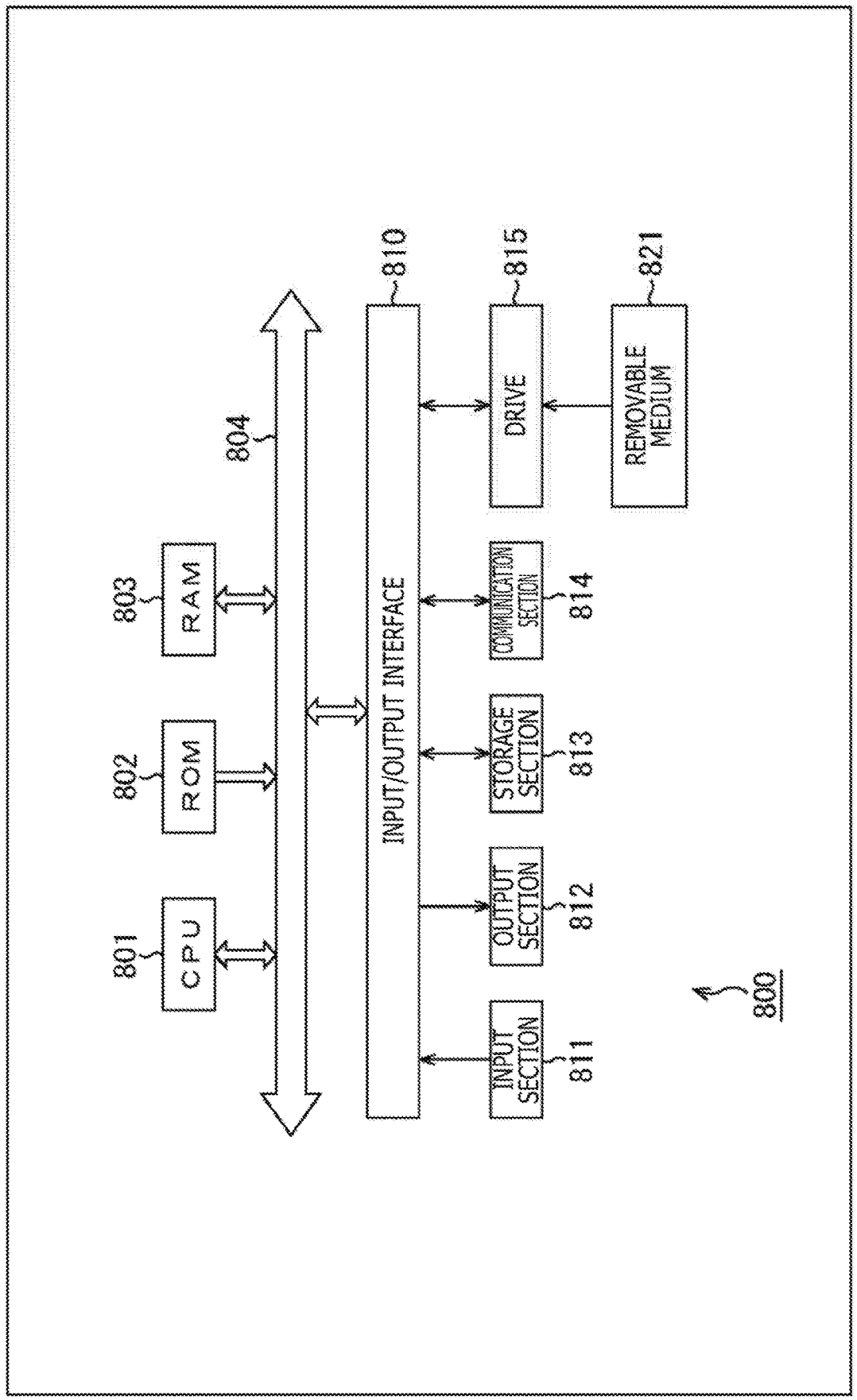
FIG. 22 is a block diagram illustrating an example of a main configuration of a computer.

FIG. 22 is a block diagram illustrating an example of a configuration of hardware of the computer that executes the series of processes described above according to the program.

In a computer 800 illustrated in FIG. 22, a CPU (Central Processing Unit) 801, a ROM (Read Only Memory) 802, and a RAM (Random Access Memory) 803 are connected to each other via a bus 804.

Further, an input/output interface 810 is also connected to the bus 804. An input section 811, an output section 812, a storage section 813, a communication section 814, and a drive 815 are connected to the input/output interface 810.

The input section 811 includes, for example, a keyboard, a mouse, a microphone, a touch panel, an input terminal, and the like. The output section 812 includes, for example, a display, a speaker, an output terminal, and the like. The storage section 813 includes, for example, a hard disk, a RAM disk, a non-volatile memory, and the like. The communication section 814 includes a network interface, for example. The drive 815 drives a removable medium 821 such as a magnetic disk, an optical disc, a magneto-optical disc, or a semiconductor memory.

In the computer configured as above, for example, the CPU 801 loads the program stored in the storage section 813 into the RAM 803 via the input/output interface 810 and the bus 804 and executes the program, through which the above-described series of processes is performed. The RAM 803 also stores data and the like necessary for the CPU 801 to execute various series of processes, as appropriate.

The program to be executed by the computer (CPU 801) can be recorded in, for example, the removable medium 821 serving as a package medium or the like, and applied. In this case, the program can be installed in the storage section 813 via the input/output interface 810 by attaching the removable medium 821 to the drive 815. Further, the program can also be provided via a wired or wireless transmission medium such as a local area network, the Internet, and digital satellite broadcasting. In this case, the program can be received by the communication section 814 and installed in the storage section 813. Additionally, the program can be installed in advance in the ROM 802 or the storage section 813.

<Supplement>

The embodiments of the present technology are not limited to the embodiments described above and various modifications can be made without departing from the scope of the present technology.

For example, the present technology can also be implemented as any configuration constituting an apparatus or a system, for example, a processor serving as a system LSI (Large Scale Integration) or the like, a module using a plurality of processors or the like, a unit using a plurality of modules or the like, and a set in which another function is further added to a unit, or the like (that is, a partial configuration of an apparatus).

It is noted that in the present specification, the system refers to a collection of a plurality of constituent elements (apparatuses, modules (components), and the like), and it does not matter whether or not all the constituent elements are within the same housing. Therefore, a plurality of apparatuses stored in separate housings and connected via a network, and a single apparatus storing a plurality of modules in a single housing are, in either case, the system.

Further, for example, the configuration described above as a single apparatus (or processing section) may be divided and configured as a plurality of apparatuses (or processing sections). Conversely, the configuration described above as a plurality of apparatuses (or processing sections) may be combined and configured as a single apparatus (or processing section). Further, needless to say, a configuration other than the above-described configurations may be added to the configuration of each apparatus (or each processing section). In addition, part of the configuration of one apparatus (or processing section) may be included in the configuration of another apparatus (or another processing section) as long as the configuration and operation as the entire system are substantially the same.

Further, for example, the present technology can be configured as cloud computing in which a single function is shared and processed collaboratively among a plurality of apparatuses via a network.

Further, for example, the programs described above can be executed in an arbitrary apparatus. In this case, it is sufficient if the apparatus has necessary functions (functional blocks and the like) and is capable of obtaining necessary information.

Further, for example, each of the steps described in the flowcharts described above can be executed by a single apparatus or by a plurality of apparatuses in a shared manner. In addition, in a case where a single step includes a plurality of processes, the plurality of processes included in the single step can be executed by a single apparatus or by a plurality of apparatuses in a shared manner. In other words, a plurality of processes included in a single step can be executed as processes in a plurality of steps. Conversely, processes described as a plurality of steps can be combined and executed as a single step.

In the program executed by the computer, the processes in steps describing the program may be executed in a chronological order in the order described in the present specification. Alternatively, the processes in steps may be executed in parallel, or may be executed individually at necessary timing on occasions of calls or the like. That is, the process in each step may be executed in an order different from the order described above as long as there is no contradiction. In addition, the processes in steps describing this program may be executed in parallel with the processes of another program or may be executed in combination with the processes of another program.

Each of the plurality of present technologies described in the present specification can be implemented independently as a single technology as long as there is no contradiction. Needless to say, the plurality of arbitrary present technologies can be implemented in combination. For example, part or all of the present technologies described in one of the embodiments can also be implemented in combination with part or all of the present technologies described in another embodiment. Further, part or all of the arbitrary present technologies described above can also be implemented in combination with another technology that is not described above.

It is noted that the present technology can also be configured as below.

(1) An image processing apparatus including:

an image processing section configured to perform image processing on each of a plurality of frame images before projection, the image processing suppressing an influence of superimposition of the plurality of frame images in a projection image in projecting each of the plurality of frame images cyclically using a corresponding one of a plurality of projection sections, the plurality of frame images being included in a moving image.

(2) The image processing apparatus according to (1), in which the image processing section performs image processing for correcting a pixel value of each of the frame images.

(3) The image processing apparatus according to (2), in which the image processing section corrects the pixel value such that an error between a corresponding one of the frame images and the projection image is minimized.

(4) The image processing apparatus according to (3), in which the image processing section sets up an objective function and a constraint as a linear programming problem to obtain a corrected pixel value as a solution.

(5) The image processing apparatus according to (4), in which the image processing section defines the objective function such that a total sum of the errors is minimized.

(6) The image processing apparatus according to (4) or (5), in which the image processing section defines the constraint such that the corresponding one of the frame images is smaller than a sum of the frame images corrected and the error and is greater than a difference between the frame images corrected and the error, and such that the error is positive.

(7) The image processing apparatus according to (6), in which the image processing section further defines a constraint such that a size of the corrected pixel value is limited according to a bit depth of the pixel value.

(8) The image processing apparatus according to any one of (4) to (7), in which the image processing section obtains the corrected pixel value using an internal point method.

(9) The image processing apparatus according to any one of (4) to (7), in which the image processing section obtains the corrected pixel value using a simplex method.

(10) The image processing apparatus according to any one of (4) to (9), in which the image processing section sets up a formula for all pixels of the corresponding one of the frame images to obtain a solution.

(11) The image processing apparatus according to any one of (4) to (10), in which the image processing section sets up a formula for all frames of the moving image to obtain a solution.

(12) The image processing apparatus according to any one of (3) to (11), in which the image processing section optimizes a filter for correcting the pixel value of the corresponding one of the frame images such that the error is minimized and corrects the frame image using the optimized filter.

(13) The image processing apparatus according to (12), in which the image processing section optimizes the filter by a method of least squares using an image prepared in advance as a learning sample, the filter being optimized such that the error is minimized.

(14) The image processing apparatus according to (13), in which the image processing section optimizes the filter using, as the learning sample, all pixels of the image prepared in advance.

(15) The image processing apparatus according to any one of (2) to (14), further including:
a distribution section configured to cyclically distribute, to a plurality of the projection sections, the frame images each including the pixel value corrected by the image processing section.

(16) The image processing apparatus according to (15), further including:
a plurality of the projection sections configured to project the frame images distributed by the distribution section to the projection sections themselves.

(17) The image processing apparatus according to (16), in which a plurality of the projection sections each projects the frame images at a rate lower than a frame rate of the moving image, the frame images being distributed to the projection sections themselves.

(18) An image processing method including:
performing image processing on each of a plurality of frame images before projection, the image processing suppressing an influence of superimposition of the plurality of frame images in a projection image in projecting each of the plurality of frame images cyclically using a corresponding one of a plurality of projection sections, the plurality of frame images being included in a moving image.

REFERENCE SIGNS LIST

100 Image projection system, 111 Central processing unit, 112 Projection apparatus, 113 Screen, 121 Image processing section, 122 Distribution section, 131 Storage section, 132 Output calculation section, 232 Learning section, 233 Prediction section, 311 Image processing apparatus, 312 Distribution apparatus, 330 Network, 351 Image projection apparatus, 362 Projection section, 381 Image projection apparatus, 800 Computer

The invention claimed is:

1. An image processing apparatus, comprising:
a plurality of projection sections;
an image processing section configured to:
perform image processing on each of a plurality of frame images before projection, wherein
the image processing prevents a reduction in quality of each of the plurality of frame images in a projection image in the projection of each of the plurality of frame images cyclically using a corresponding one of the plurality of projection sections, and
the plurality of frame images is included in a moving image; and
perform the image processing to correct a pixel value of each of the plurality of frame images; and
a distribution section configured to cyclically distribute, to the plurality of projection sections, the plurality of frame images each including the pixel value corrected by the image processing section, wherein
the plurality of projection sections is configured to project, at a rate lower than a frame rate of the moving image, the plurality of frame images distributed by the distribution section to the plurality of projection sections.

2. The image processing apparatus according to claim 1, wherein the image processing section is further configured to correct the pixel value such that an error between a corresponding one of the plurality of frame images and the projection image is minimized.

3. The image processing apparatus according to claim 2, wherein the image processing section is further configured to set up an objective function and a constraint as a linear programming problem to obtain a corrected pixel value as a solution.

4. The image processing apparatus according to claim 3, wherein the image processing section is further configured to define the objective function such that a total sum of errors is minimized.

5. The image processing apparatus according to claim 3, wherein the image processing section is further configured to define the constraint such that the corresponding one of the frame images is smaller than a sum of the frame images corrected and the error and is greater than a difference between the plurality of frame images corrected and the error, and such that the error is positive.

6. The image processing apparatus according to claim 5, wherein the image processing section is further configured to define a constraint such that a size of the corrected pixel value is limited according to a bit depth of the pixel value.

7. The image processing apparatus according to claim 3, wherein the image processing section is further configured to obtain the corrected pixel value based on an internal point method.

8. The image processing apparatus according to claim 3, wherein the image processing section is further configured to obtain the corrected pixel value using a simplex method.

9. The image processing apparatus according to claim 3, wherein the image processing section is further configured to set up a formula for all pixels of the corresponding one of the plurality of frame images to obtain a solution.

10. The image processing apparatus according to claim 3, wherein the image processing section is further configured to set up a formula for all frames of the moving image to obtain a solution.

11. The image processing apparatus according to claim 2, wherein the image processing section is further configured to:
optimize a filter to correct the pixel value of the corresponding one of the plurality of frame images such that the error is minimized; and
correct a frame image based on the optimized filter.

12. The image processing apparatus according to claim 11, wherein
the image processing section is further configured to optimize the filter by a method of least squares using an image prepared in advance as a learning sample, and
the filter is optimized such that the error is minimized.

13. The image processing apparatus according to claim 12, wherein the image processing section is further configured to optimize the filter using, as the learning sample, all pixels of the image prepared in advance.

14. An image processing method, comprising:
performing image processing on each of a plurality of frame images before projection, wherein
the image processing prevents a reduction in quality of each of the plurality of frame images in a projection image in the projection of each of the plurality of frame images cyclically using a corresponding one of a plurality of projection sections, and
the plurality of frame images is included in a moving image; and
performing the image processing to correct a pixel value of each of the plurality of frame images;
distributing, to the plurality of projection sections, the plurality of frame images each including the pixel value corrected by an image processing section; and
projecting, at a rate lower than a frame rate of the moving image, the plurality of frame images distributed by a distribution section to the plurality of projection sections.

* * * * *